United States Patent [19]
Eda

[11] Patent Number: 5,373,579
[45] Date of Patent: Dec. 13, 1994

[54] OPTICAL WAVEGUIDE DEVICE

[75] Inventor: Kazuo Eda, Nara, Japan

[73] Assignee: Matsushita Electric Industrial Co., Ltd., Osaka, Japan

[21] Appl. No.: 87,436

[22] Filed: Jul. 8, 1993

[30] Foreign Application Priority Data

Jul. 8, 1992 [JP] Japan ................... 4-180857
Sep. 1, 1992 [JP] Japan ................... 4-233391
Apr. 2, 1993 [JP] Japan ................... 5-076618

[51] Int. Cl.⁵ ................... G02B 6/10; G02B 6/12
[52] U.S. Cl. ................... 385/131
[58] Field of Search ................... 385/41, 130, 131

[56] References Cited

U.S. PATENT DOCUMENTS

| | | | |
|---|---|---|---|
| 4,582,390 | 4/1986 | Furuya ................... | 385/131 |
| 5,113,469 | 5/1992 | Hatakoshi et al. ................... | 385/131 X |
| 5,125,065 | 6/1992 | Stoll et al. ................... | 385/131 X |
| 5,157,748 | 10/1992 | Mueller et al. ................... | 385/131 X |
| 5,185,830 | 2/1993 | Nishimoto ................... | 385/131 X |

FOREIGN PATENT DOCUMENTS

52-23355 2/1977 Japan .
63-261219 10/1988 Japan .
2191603 12/1987 United Kingdom .

OTHER PUBLICATIONS

Optics Communications. vol. 36, No. 1, 1 Jan. 1981, Amsterdam NL, pp. 25-30, R. Th. Kersten 'Multimode intergrated optics using dielectric and hollow metallic waveguides'.

"Waveguide Electrooptic Modulators" by Rod C. Alferness: IEEE Transactions on Microwave Theory and Techniques, vol. MTT-30, No. 8: Aug. 1982: pp. 1121-1137.

"Optical Waveguide Modulators" by Ivan P. Kaminow et al.: IEEE Transactions on Microwave Theory and Techniques, vol. MTT-23, No. 1, Jan. 1975: pp. 57-70.

*Primary Examiner*—Akm E. Ullah
*Attorney, Agent, or Firm*—Lowe, Price, LeBlanc & Becker

[57] ABSTRACT

An optical waveguide device comprises a first transparent dielectric substrate having a predetermined index of refraction and a predetermined coefficient of thermal expansion, and a second transparent dielectric substrate having the same index of refraction and coefficient of thermal expansion as the first transparent dielectric substrate. An intervening layer having an index of refraction smaller than the index of refraction of the first and second transparent dielectric substrates is interposed between the first and second transparent dielectric substrates. An optical waveguide path is formed in at least either of the first and second transparent dielectric substrates.

44 Claims, 15 Drawing Sheets

OPTICAL WAVEGUIDE DEVICE

BACKGROUND OF THE INVENTION

1. Field of the Invention

The present invention relates generally to a structure for improving the performance of various optical devices used for light intensity modulation, light switching, plane of polarization control, propagation mode control, optical phase matching control for second harmonic generation and other optical controls, and manufacturing method of the same.

2. Description of the Prior Art

Optical waveguide devices, having been conventional developed, have optical waveguide paths formed on transparent dielectric substrates (such as lithium niobate ($LiNbO_3$)). These optical waveguide paths are variously shaped and associated with appropriate electrodes to control or modulate lights passing through therein by using electrooptic effect. For example, R. Alferness discloses this type of optical waveguide modulator in the paper, "Waveguide Electrooptic Modulators", IEEE Transactions on Microwave and Techniques, Vol. MTT-30, No.8, 1121–1137(1982). Furthermore, I. Kaminow discloses various manufacturing methods for this kind of optical waveguide device in the paper, "Optical Waveguide Modulators" IEEE Transactions on Microwave and Techniques. Vol. MTT-23, No. 1, 57–70(1975). These papers disclose various optical waveguide devices.

In one such manufacturing method, lithium niobate or lithium tantalate is heat-treated at a high temperature to modify the refractive index of the material by out-diffusing the lithium. Alternatively, a metallic film of, for example, titanium is formed by vacuum evaporation and thermally diffused at a high temperature to raise the refractive index of the diffused area slightly above that of the surrounding area. In either case, the difference in refractive indices is used to confine light. An example of a Mach-Zehnder type optical modulator using a titanium diffusion is described in Unexamined Japanese Patent Application No. 63-261219/1988.

In another method, a metallic mask is formed over the specified areas and a proton-ion exchange is induced in phosphoric acid at 200° C. to 300° C., partially modifying the refractive index and forming the optical waveguide. Manufacturing methods that rely on out-diffusion, thermal diffusion, or ion exchange from the surface all form the optical waveguide by means of diffusion from the surface. The cross section of the optical waveguide is therefore necessarily determined by the diffusion process, resulting in numerous problems.

One of the biggest problems is coupling loss between the optical waveguide and the optical fiber. While the cross section of an optical fiber is circular, the shape of the most conventional optical waveguide is roughly an inverted triangle due to the formation of the waveguide by diffusion from the surface. Because the strength of the guided light is greatest near the surface, optical coupling with the optical fiber is poor, resulting in significant loss. Reducing this optical coupling loss is therefore an extremely important topic in optical waveguide device design.

Another problem caused by diffusion processing is greater optical propagation loss after diffusion processing than before. With titanium diffusion optical waveguide, for example, propagating loss of more than 1 dB/cm normally occurs. Reducing propagating loss is therefore another major topic in optical waveguide device design.

A third problem is the increase in optical damage resulting from diffusion processing. Optical damage refers the increase in propagation loss over time when a high intensity light source or a short wavelength light source is input to a diffusion-type optical waveguide. This is believed to be caused by the diffusion of ions in the optical waveguide resulting in increased trapping of electrons in the optical waveguide.

It should be noted that methods for forming an optical waveguide without relying on diffusion processing have been described. One of these is described by Kaminow (see above reference). In this method, lithium niobate crystals are grown on top of a lithium tantalate layer, or a lithium niobate thin-film is formed by sputtering on top of a lithium niobate or lithium tantalate layer, and the optical waveguide is formed in this lithium niobate top layer. A similar method is described in Unexamined Japanese Patent Application No. 5223355/1977. This method also forms an epitaxial growth lithium niobate top layer over a substrate of lithium tantalate (e.g.) using liquid phase, gas phase, fusion, or other method, and forms the optical waveguide in this top layer. There are, however, several problems with these optical waveguide formation methods using such thin-film crystal growth technologies. First, it is difficult to obtain a thick-film in epitaxial growth film, and productivity is accordingly poor, because of the growth speed and flaws occurring in the crystals while being grown. In addition, the coupling characteristics of a thin film less than 5 micron thick with an optical fiber having a core diameter of approximately 10 microns are also poor. (The fiber core being where the light is confined.)

Productivity is further hampered because a good quality single crystal thin-film cannot be obtained unless the lattice constants of the thin-film is essentially the same as those of the substrate. It is therefore extremely difficult to form a good lithium niobate thin-film on a lithium tantalate substrate, and a mixed niobium-tantalum crystal film is often used. Pure lithium niobate, however, offers superior overall optical waveguide characteristics when compared with a mixed crystal film.

To increase the thickness of the growth layer, it may be possible to use the same material between the growth layer and the substrate. But, the growth layer and substrate if made by the same material will have the same crystal orientation. Due to the same crystal orientation, no satisfactory difference will be obtained in the indices of refraction between the growth layer and substrate.

SUMMARY OF THE INVENTION

It is therefore an object of the present invention to provide a novel optical waveguide device and a manufacturing method of the same which is capable of reducing coupling loss, propagation loss, and optical damage with respect to an ordinary optical fiber.

In order to attain above object, a first aspect of the present invention provides an optical waveguide device comprising: a first transparent dielectric substrate having a predetermined index of refraction and a predetermined coefficient of thermal expansion; a second transparent dielectric substrate having the same index of refraction and coefficient of thermal expansion as said first transparent dielectric substrate; an intervening layer having an index of refraction smaller than the index of refraction of said first and second transparent dielectric substrates, said intervening layer being interposed between said first and second transparent dielectric substrates; and an optical waveguide path formed in at least either of said first and second transparent dielectric substrates.

Furthermore, a second aspect of the present invention provides an optical waveguide device comprising: a first transparent dielectric substrate having a predetermined index of refraction; a second transparent dielectric substrate having an index of refraction larger than said first transparent dielectric substrate, said second transparent dielectric substrate being directly connected with said first transparent dielectric substrate; and an optical waveguide path formed in said second transparent dielectric substrate.

Still further, a third aspect of the present invention provides an optical waveguide device comprising: a first transparent dielectric substrate having a predetermined index of refraction; a second transparent dielectric substrate having an index of refraction larger than said first transparent dielectric substrate; an intervening layer interposed between said first and second transparent dielectric substrates; and an optical waveguide path formed in said second transparent dielectric substrate.

Moreover, a fourth aspect of the present invention provides an optical waveguide device comprising: a glass substrate having a predetermined index of refraction; a transparent dielectric substrate having an index of refraction larger than said glass substrate, said transparent dielectric substrate being directly connected with said glass substrate: and an optical waveguide path formed in said transparent dielectric substrate.

Yet further a fifth aspect of the present invention provides an optical waveguide device comprising: a glass substrate having a predetermined index of refraction; a transparent dielectric substrate having an index of refraction larger than said glass substrate; an intervening layer interposed between said glass substrate and said transparent dielectric substrate; and an optical waveguide path formed in said transparent dielectric substrate.

The above and other objects, features and advantages of the present invention will become more apparent from the following detailed description which is to be read in conjunction with the accompanying drawings.

DETAILED DESCRIPTION OF PREFERRED EMBODIMENTS

Hereinafter, preferred embodiments of the present invention will be described in detail with reference to accompanying drawings.

1. FIRST EMBODIMENT

Figure 1:
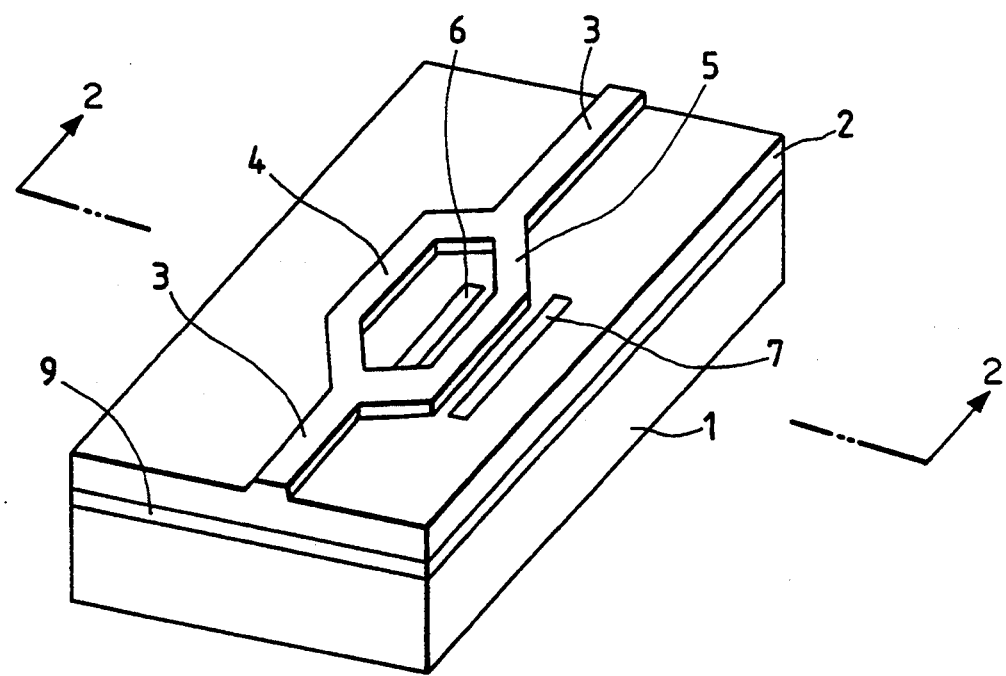
FIG. 1 is a perspective view showing an optical waveguide device adopted to an optical modulator in accordance with a first embodiment of the present invention.
Figure 2:
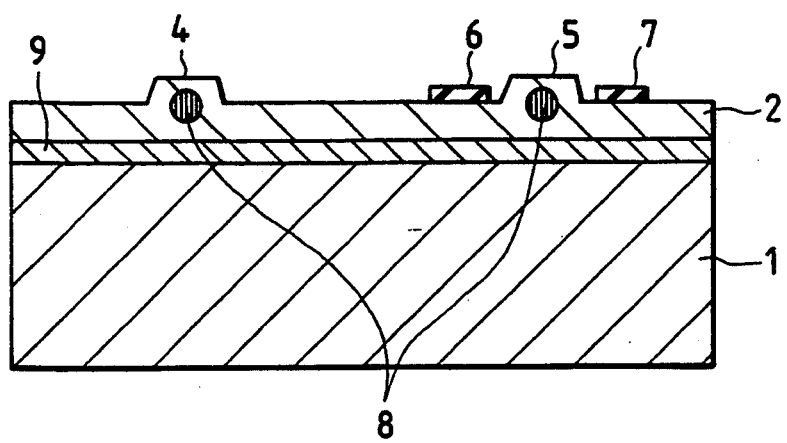
FIG. 2 is a cross-sectional view showing the optical waveguide device of the first embodiment, taken along a line A—A of FIG. 1.

FIGS. 1 and 2 show the first embodiment of the present invention, which is applied to an optical modulator. In the drawings, a reference numeral 1 represents a first transparent dielectric substrate having predetermined index of refraction and coefficient of thermal expansion. A reference numeral 2 represents a second transparent dielectric substrate having the same index of refraction and coefficient of thermal expansion as the first transparent dielectric substrate 1. This second transparent dielectric substrate 2 is formed thin compared with the first transparent dielectric substrate 1. A reference numeral 3 represents an inlet or outlet portion of an optical waveguide path, formed on the second transparent dielectric substrate 2 at opposite ends thereof. An intermediate portion of the optical waveguide path between the inlet and outlet portions 3, 3 is split symmetrically into two at the center of the second transparent dielectric substrate 2. One is a first bifurcated optical waveguide path 4, and the other is a second bifurcated optical waveguide path 5. These two bifurcated optical waveguide paths 4 and 5 are formed in parallel with each other. At opposite sides of the second bifurcated optical waveguide path 5, there is provided a pair of electrodes 6 and 7 of aluminum. An intervening layer 9, being a dielectric material and having an index of refraction smaller than that of the first and second transparent dielectric substrates 1, 2, interposes between the first and second transparent dielectric substrates 1, 2.

The first and second bifurcated optical waveguide paths 4, 5, having the same cross section of a trapezoid, constitute so-called ridges. The cross section of the first and second bifurcated waveguide paths 4, 5 is the same as that of the inlet and outlet portions 3, 3 of the optical waveguide path. A reference numeral 8 represents a light propagating region of an optical waveguide path.

The construction disclosed here is referred to as Mach-Zehnder type, in which a light entered from the inlet portion 3 is introduced into bifurcated two intermediate paths 4, 5, one 5 of which is applied with a certain voltage to change its index of refraction by using electrooptical effect. A propagation speed of the light, passing through the bifurcated waveguide path 5, changes due to the change of the index of refraction of the bifurcated waveguide path 5. With this change of propagation speed, two lights propagating in the first and second bifurcated intermediate paths 4, 5 are modified to be out of phase with each other. These two lights are merged into one again in the outlet portion 3. Thus merged light has a modified intensity compared with the original one. Thus, the optical modulation can be carried out in the Mach-Zehnder type optical waveguide device.

A monocrystal lithium niobate and a monocrystal lithium tantalate respectively having a large electrooptical effect are selectively used in this embodiment as the material constituting the first and second transparent dielectric substrates 1 and 2. The monocrystal lithium niobate has an index of refraction of 2.29 with respect to an ordinary light. On the other hand, the monocrystal lithium tantalate has an index of refraction of 2.18 with respect to the ordinary light. It should be noted that these indices of refraction tend to slightly vary based on respective crystal orientations. This embodiment selected a pair of transparent dielectric substrates made of the same material having the same crystal orientation. With this combination, the coefficients of the first and second transparent dielectric substrates become identical with each other.

The intervening layer 9 preferably comprises a component selected from the group consisting of silicon, silicon compound, and metallic oxide. Silicon dioxide and silicon nitride are selectively used in this embodiment as the material constituting the intervening layer 9. Indices of the silicon dioxide and silicon nitride are approximately 1.5 and 2.0, respectively, with respect to the ordinary light. Namely, the index of refraction of the intervening layer 9 can be made smaller than that of the first and second transparent dielectric substrates 1, 2, if silicon dioxide or silicon nitride is adopted as the intervening layer 9 while lithium niobate or lithium tantalate is selected as the first and second transparent dielectric substrates 1, 2.

In order to confine the propagation of lights or electromagnetic waves in either of the first and second transparent dielectric substrates 1, 2, it is necessary to increase a thickness of the intervening layer 9 to a certain degree. In practice, the thickness of the intervening layer 9 is selected $2\mu m$ in the case where the first and second transparent dielectric substrates 1, 2 are $400\mu m$ and $7\mu m$, respectively, in thickness. The thickness of the intervening layer 9 should be selected to be equal to or more than a wavelength of a light to be used.

Furthermore, the ridge configuration of this embodiment is effective in the localized confinement of the propagation of lights or electromagnetic waves. Because, the portion right beneath the ridge has a larger effective index of refraction compared with other portion. In this embodiment, the specific dimension of the ridge is determined as follows: A height of the ridge is $2\mu m$; a width of the waveguide path is $7\mu m$; a length of the bifurcated portion of the waveguide path is 2 cm; and an whole length of the waveguide path is 3 cm.

The ridge configuration is further advantageous in that a center of the propagation, i.e. a portion at which an intensity of light or electromagnetic wave is strongest, is positioned almost identically with the center of the waveguide path formed beneath the ridge. Moreover, the shape of the propagation of lights or electromagnetic waves is similar to a circle. As the inlet and outlet portion 3, 3 of the waveguide path have the same circular constructions, the coupling efficiency with respect to an optical fiber, which has generally a circular core (approximately $10\mu m$ in a diameter), is greatly improved.

In fact, a coupling loss with respect to the optical fiber was less than 0.3-0.5 dB at one side in the case where an adhesive material whose index of refraction is appropriately adjusted is used to connect the optical fiber and the waveguide device of this embodiment. On the contrary, this coupling loss increases to a value equal to or more than 1.0 dB if the conventional diffused type optical waveguide device made of lithium niobate or lithium tantalate is used.

Still further, the propagation loss of lights or electromagnetic waves can be suppressed to the least value because the transparent dielectric substrates used in this embodiment are made of pure monocrystal, which requires no ion-diffusion treatment. In more detail, a value equal to or less than 0.5 dB/cm was easily attained in the propagation loss.

Furthermore no optical damage was found, although the optical damage was measured by increasing the intensity of incident light from 0 dBm to 20 dBm. This good result; is considered to be derived from the excellent property of the monocrystal substrate having very small electronic trap.

Yet further, the performance as an optical modulator was as well as the conventional device.

A light used in the measurement was a wavelength of 1.3μm.

No adhesive material of organic substance was used for the connection between the intervening layer and the substrate. Instead, intermolecular force and electrostatic force are utilized for tightly bonding these inorganic substances. This connection is advantageous in productivity because it is easy and quick to complete the connection. But, such a direct-type connection is weak against temperature change. If the coefficients of two substrates are different from each other, distortion will occur in the connecting area with increasing temperature. This means that no sufficient connecting strength would be obtained. Therefore, it is important to improve the durability or reliability against temperature change. For this purpose, it is preferable to use substrates having the same coefficients of thermal expansion. Secondly, it is further preferable that the crystal orientations of these substrates are identical with each other. Because, the coefficient of thermal expansion may slightly vary depending on the crystal orientation. As the substrates used in this embodiment are made of the same material having the same crystal orientation, its direct-type connection is firm and therefore reliable.

Barium titanate, potassium niobate, and potassium titanophosphate are prospective materials which have similar electrooptical effect and can be equivalently used as a transparent dielectric substrate of the present invention instead of lithium niobate or lithium tantalate. The indices of refraction of barium titanate, potassium niobate, and potassium titanophosphate are 2.4, 2.2, and 1.7, respectively.

Various metallic oxide including zinc oxide, aluminum oxide, indium oxide, various soda glass, and optical glass can be used as the intervening layer of the present invention instead of silicon dioxide or silicon nitride. The indices of refraction of zinc oxide, aluminum oxide, indium oxide are 2.0, 1.6, 2.0, respectively. That of various soda glass is approximately 1.5, and the optical glass is 1.5–1.8.

1.1. FIRST METHOD

A first example of the method of manufacturing the optical waveguide device of the first embodiment will be explained below with reference to FIGS. 3(a)-3(h).

Figure 3A:
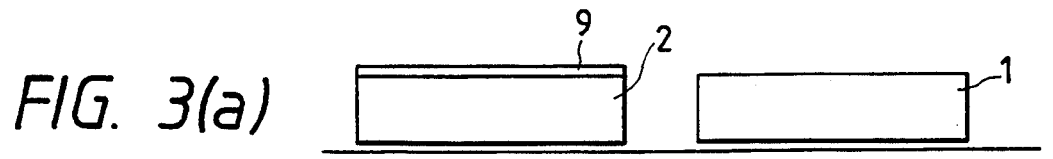
FIGS. 3(a)-3(h) are views showing a first example of the method of manufacturing the optical waveguide device, by which the optical waveguide device of the first embodiment is manufactured.

First of all, first and second transparent dielectric substrates 1 and 2, which are identical with each other in index of refraction and coefficient of thermal expansion, are prepared. The surfaces of these first and second transparent dielectric substrates 1 and 2, which have been ground and finished as mirror surfaces beforehand, are smoothed and cleaned. The intervening layer 9 of silicon dioxide or silicon nitride, which has an index of refraction smaller than that of the first and second transparent dielectric substrates 1 and 2, is grown on at least either of the smoothed and cleaned surfaces of the first and second transparent dielectric substrates 1 and 2, as shown in FIG. 3(a). A conventional growth method such as chemical vapor deposition (CVD) or spattering is used to form this intervening layer 9.

Figure 3B:
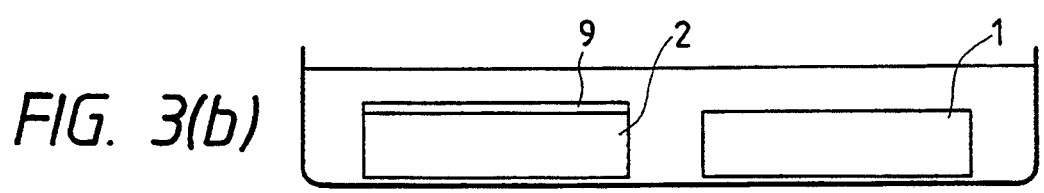
Figure 3C:
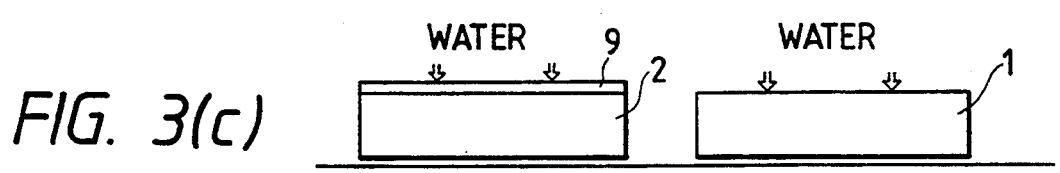
Figure 3D:
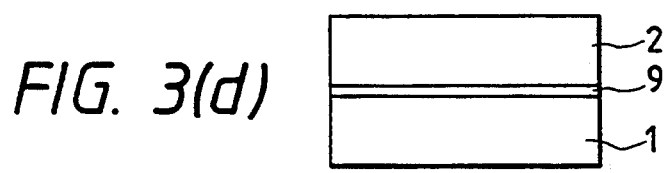

Thereafter, both surfaces to be bonded through the intervening layer 9, i.e. the upper surface of the intervening layer 9 and the upper surface of the first transparent dielectric substrate 1 in the drawing, are adopted a hydrophilic treatment. In detail, they are soaked in a solution consisting of hydrogen peroxide ($H_2O_2$) - ammonia ($NH_3$) - water($H_2O$), as shown in FIG. 3(b). Subsequently, the surfaces to be bonded are watered as shown in FIG. 3(c). This watering treatment allows components constituting water to adhere on the surfaces of the substrate 1 and intervening layer 9. Immediately after the watering treatment, both surfaces of the substrate 1 and the intervening layer 9 are uniformly connected together as shown in FIG. 3(d) without using any organic adhesive material. Namely, this connection is direct-type connection achieved by the bonding power of water, hydroxyl group, hydrogen ions adhering on the surface of the substrate 1 or the intervening layer 9.

Figure 3E:
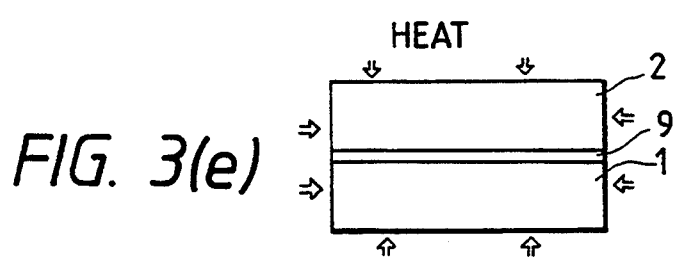

In turn, a heat treatment is adopted to the assembly of the substrates 1, 2 and the intervening layer 9 interposing therebetween, as shown in FIG. 3(e). The temperature is increased to a point equal to or more than 100° C. This heat treatment ensures the connecting strength to be further increased. The reason is considered as follows: As the heat treatment progresses, water and hydrogen are gradually removed off the connecting surfaces. Then, remaining oxygen reacts with the component of the transparent dielectric substrates 1, 2 and, as a result, a firm connection is finally obtained.

Figure 3F:
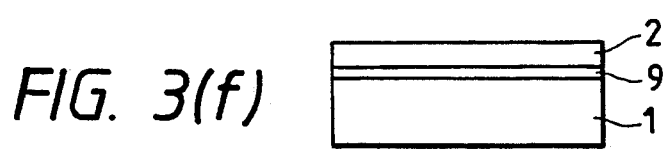
Figure 3G:
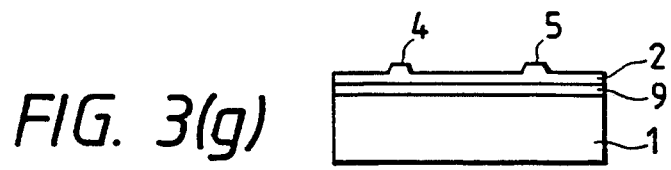
Figure 3H:
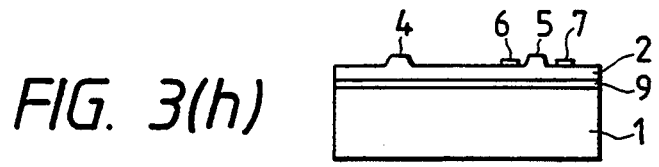

Next, in order to form an optical waveguide path, either of the substrates, i.e. the second transparent dielectric substrate 2 in the drawing, is thinned by the mechanical grind and etching as shown in FIG. 3(f). A thickness of the second substrate 2 is reduced to a level of 7–10μm. On the surface of the second substrate 2, there is then formed an etching mask corresponding to the Mach-Zehnder type optical waveguide structure shown in FIG. 1 by using photolithography. Thus, the portion other than ridges 4, 5 of the optical waveguide structure is removed off by etching as shown in FIG. 3(g). The depth formed by this etching is 2μm. Chrome-gold is used as the mask. The etchant used here contains hydrofluoric acid. Thereafter, the mask is removed and a pair of electrodes 6, 7 is formed by the ordinary photolithography and etching techniques as shown in FIG. 3(h). In this manner, according to this first example of the manufacturing method, the optical waveguide device of the first embodiment can be obtained.

1.2. SECOND METHOD

A second example of the method of manufacturing the optical waveguide device of the first embodiment will be explained below with reference to FIGS. 4(a)-4(f).

Figure 4A:
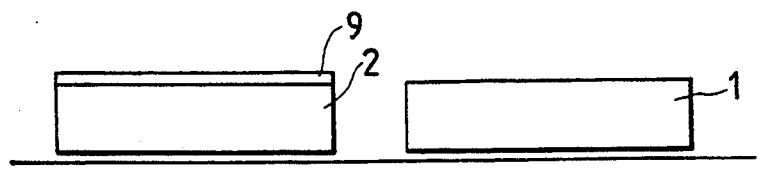
FIGS. 4(a)-4(f) are views showing a second example of the method of manufacturing the optical waveguide device, by which the optical waveguide device of the first embodiment is manufactured.

First of all, first and second transparent dielectric substrates 1 and 2, which are identical with each other in index of refraction and coefficient of thermal expansion, are prepared. The surfaces of these first and second transparent dielectric substrates 1 and 2, which have been ground and finished as mirror surfaces beforehand, are smoothed and cleaned. The intervening layer 9 of silicon dioxide or silicon nitride, which has an index of refraction smaller than that of the first and second transparent dielectric substrates 1 and 2, is grown on at least either of the smoothed and cleaned surfaces of the first and second transparent dielectric substrates 1 and 2, as shown in FIG. 4(a). A conventional growth method such as chemical vapor deposition (CVD) or spattering is used to form this intervening layer 9.

Figure 4B:
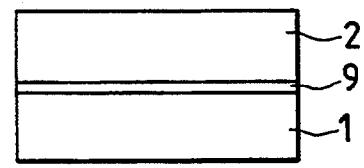

Thereafter, both surfaces to be bonded through the intervening layer 9, i.e. the upper surface of the intervening layer 9 and the upper surface of the first transparent dielectric substrate 1 in the drawing, are uniformly connected together as shown in FIG. 4(b) without using any organic adhesive material.

Figure 4C:
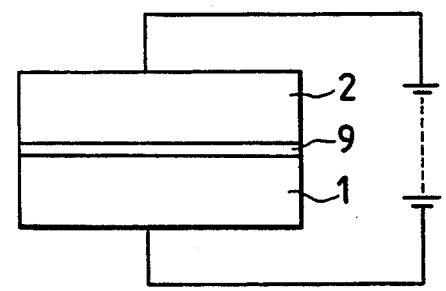

A direct voltage of 100–2,000 V is applied to the assembly of the substrates 1, 2 and the intervening layer 9 interposing therebetween, as shown in FIG. 4(c). The DC voltage generally induces a flow of ions on the connecting surfaces, which is considered to generate electrostatic bonding force. This connection will be accomplished more quickly if a heat treatment is additionally adopted. In any case, the usage of DC voltage ensures a direct-type connection at a lower temperature compared with the above-described first method.

Figure 4D:
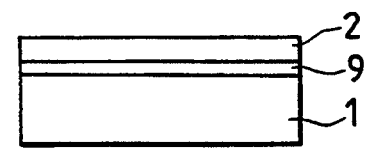
Figure 4E:
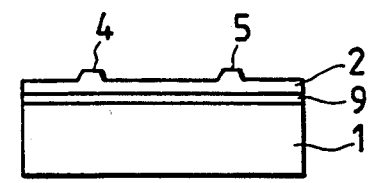
Figure 4F:
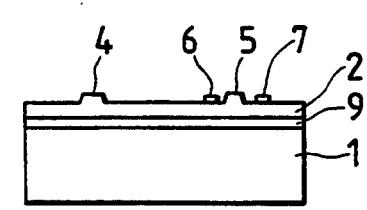

Next, in order to form an optical waveguide path, either of the substrates, i.e. the second transparent dielectric substrate 2 in the drawing, is thinned by the mechanical grind and etching as shown in FIG. 4(d). A thickness of the second substrate 2 is reduced to a level of 7–10μm. On the surface of the second substrate 2, there is then formed an etching mask corresponding to the Mach-Zehnder type optical waveguide structure shown in FIG. 1 by using photolithography. Thus, the portion other than ridges 4, 5 of the optical waveguide structure is removed off by etching as shown in FIG. 4(e). The depth formed by this etching is 2μm. Chromegold is used as the mask. The etchant used here contains hydrofluoric acid. Thereafter, the mask is removed and a pair of electrodes 6, 7 is formed by the ordinary photolithography and etching techniques as shown in FIG. 4(f). In this manner, according to this second example of the manufacturing method, the optical waveguide device of the first embodiment can be obtained.

1.3. THIRD METHOD

A third example of the method of manufacturing the optical waveguide device of the first embodiment will be explained below with reference to FIGS. 5(a)–5(h).

Figure 5A:
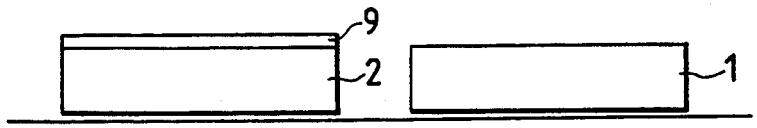
FIGS. 5(a)-5(h) are views showing a third example of the method of manufacturing the optical waveguide device, by which the optical waveguide device of the first embodiment is manufactured.

First of all, first and second transparent dielectric substrates 1 and 2, which are identical with each other in index of refraction and coefficient of thermal expansion, are prepared. The surfaces of these first and second transparent dielectric substrates 1 and 2, which have been ground and finished as mirror surfaces beforehand, are smoothed and cleaned. The intervening layer 9 of silicon dioxide or silicon nitride, which has an index of refraction smaller than that of the first and second transparent dielectric substrates 1 and 2, is grown on at least either of the smoothed and cleaned surfaces of the first and second transparent dielectric substrates 1 and 2, as shown in FIG. 5(a). A conventional growth method such as chemical vapor deposition (CVD) or spattering is used to form this intervening layer 9.

Figure 5B:
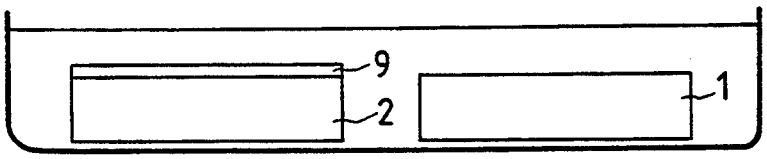
Figure 5C:
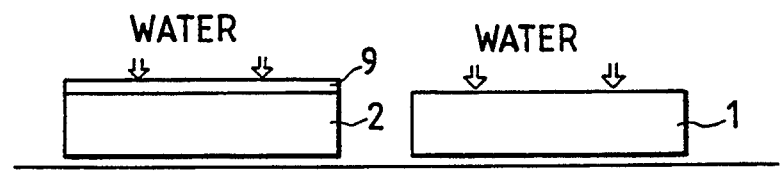
Figure 5D:
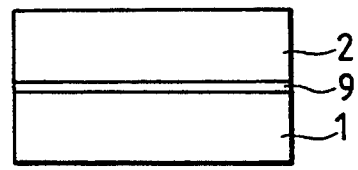

Thereafter, both surfaces to be bonded through the intervening layer 9, i.e. the upper surface of the intervening layer 9 and the upper surface of the first transparent dielectric substrate 1 in the drawing, are adopted a hydrophilic treatment. In detail, they are soaked in a solution consisting of hydrogen peroxide ($H_2O_2$) - ammonia ($NH_3$) - water($H_2O$), as shown in FIG. 5(b). Subsequently, the surfaces to be bonded are watered as shown in FIG. 5(c). This watering treatment allows components constituting water to adhere on the surfaces of the substrate 1 and intervening layer 9. Immediately after the watering treatment, both surfaces of the substrate 1 and the intervening layer 9 are uniformly connected together as shown in FIG. 5(d) without using any organic adhesive material. Namely, this connection is direct-type connection achieved by water, hydroxyl group, hydrogen adhering on the surface of the substrate 1 or the intervening layer 9.

Figure 5E:
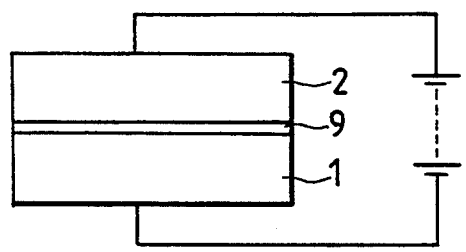

A direct voltage of 100–2,000 V is applied to the assembly of the substrates 1, 2 and the intervening layer 9 interposing therebetween, as shown in FIG. 5(e). This connection will be accomplished more quickly if a heat treatment is additionally adopted. In any case, the usage of DC voltage ensures a direct-type connection at a lower temperature compared with the above-described first method.

Figure 5F:
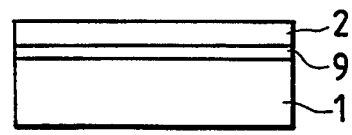
Figure 5G:
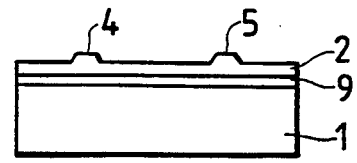
Figure 5H:
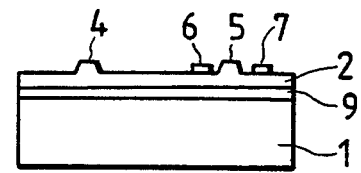

Next, in order to form an optical waveguide path, either of the substrates, i.e. the second transparent dielectric substrate 2 in the drawing, is thinned by the mechanical grind and etching as shown in FIG. 5(f). A thickness of the second substrate 2 is reduced to a level of 7–10μm. On the surface of the second substrate 2, there is then formed an etching mask corresponding to the Mach-Zehnder type optical waveguide structure shown in FIG. 1 by using photolithography. Thus, the portion other than ridges 4, 5 of the optical waveguide structure is removed off by etching as shown in FIG. 5(g). The depth formed by this etching is 2μm. Chromegold is used as the mask. The etchant used here contains hydrofluoric acid. Thereafter, the mask is removed and a pair of electrodes 6, 7 is formed by the ordinary photolithography and etching techniques as shown in FIG. 5(h). In this manner, according to this third example of the manufacturing method, the optical waveguide device of the first embodiment can be obtained.

1.4. FOURTH METHOD

A fourth example of the method of manufacturing the optical waveguide device of the first embodiment will be explained below with reference to FIGS. 6(a)–6(f).

Figure 6A:
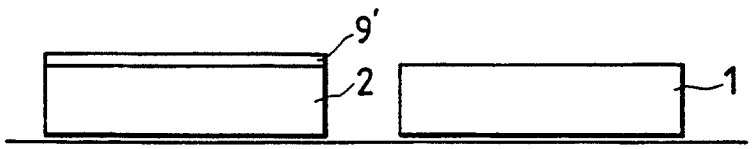
FIGS. 6(a)-6(f) are views showing a fourth example of the method of manufacturing the optical waveguide device, by which the optical waveguide device of the first embodiment is manufactured.
Figure 6B:
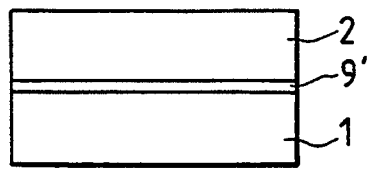

First of all, first and second transparent dielectric substrates 1 and 2, which are identical with each other in index of refraction and coefficient of thermal expansion, are prepared. The surfaces of these first and second transparent dielectric substrates 1 and 2, which have been ground and finished as mirror surfaces beforehand, are smoothed and cleaned. A glass layer 9' having a low melting point, whose index of refraction is smaller than that of the first and second transparent dielectric substrates 1 and 2, is grown on at least either of the smoothed and cleaned surfaces of the first and second transparent dielectric substrates 1 and 2, as shown in FIG. 6(a). A conventional growth method such as chemical vapor deposition (CVD) or spattering is used to form this glass layer 9'. Thereafter, both surfaces to be bonded through the glass layer 9', i.e. the upper surface of the glass layer 9' and the upper surface of the first transparent dielectric substrate 1 in the drawing, are uniformly connected together as shown in FIG. 6(b) without using any organic adhesive material.

Figure 6C:
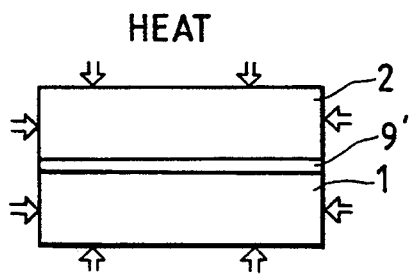

In turn, a heat treatment is adopted to the assembly of the substrates 1, 2 and the glass layer 9' interposing therebetween, as shown in FIG. 6(c). The temperature is increased to or a point nearly equal to the melting point of this glass layer. It is preferable to select the glass layer 9' from glass materials whose melting point are in a range of 300°–800° C. This heat treatment ensures the strength of this direct connection to be increased.

If the temperature is increased to exceed the melting point of the glass layer 9', perfect melting of glass layer 9' and subsequent firm connection will be surely taken place. However, even if the temperature does not exceed the melting point, satisfactory connection would be obtained by the softened glass. This will bring a merit of maintaining an original thickness of the glass layer.

Figure 6D:
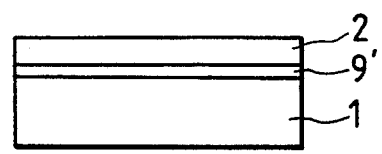
Figure 6E:
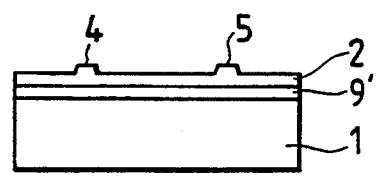
Figure 6F:
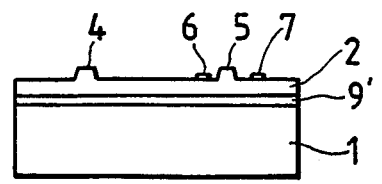

Next, in order to form an optical waveguide path, either of the substrates, i.e. the second transparent dielectric substrate 2 in the drawing, is thinned by the mechanical grind and etching as shown in FIG. 6(d). A thickness of the second substrate 2 is reduced to a level of 7–10μm. On the surface of the second substrate 2, there is then formed an etching mask corresponding to the Mach-Zehnder type optical waveguide structure shown in FIG. 1 by using photolithography. Thus, the portion other than ridges 4, 5 of the optical waveguide structure is removed off by etching as shown in FIG. 6(e). The depth formed by this etching is 2μm. Chrome-gold is used as the mask. The etchant used here contains hydrofluoric acid. Thereafter, the mask is removed and a pair of electrodes 6, 7 is formed by the ordinary photolithography and etching techniques as shown in FIG. 6(f). In this manner, according to this fourth example of the manufacturing method, the optical waveguide device of the first embodiment can be obtained.

2. SECOND EMBODIMENT

Figure 7:
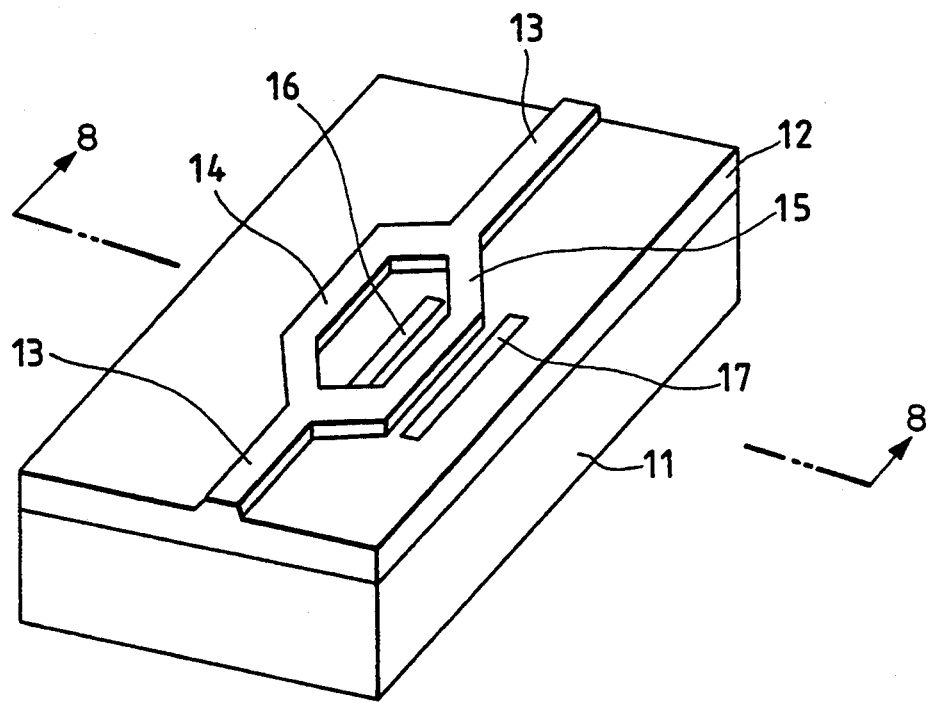
FIG. 7 is a perspective view showing an optical waveguide device adopted to an optical modulator in accordance with a second embodiment of the present invention.
Figure 8:
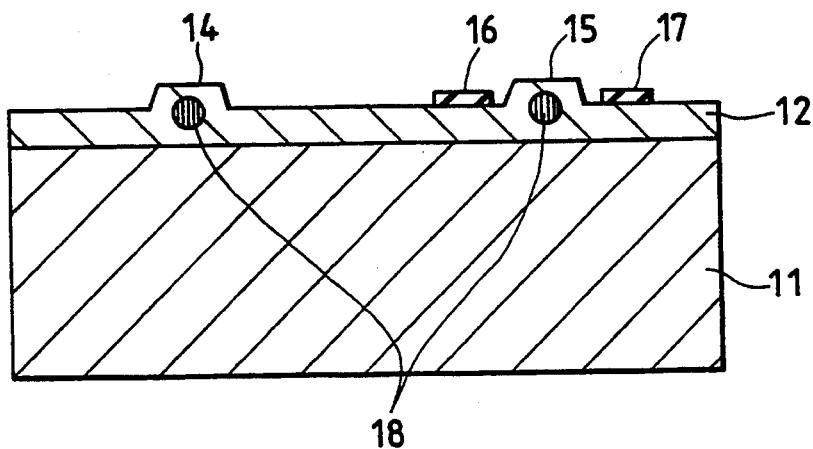
FIG. 8 is a cross-sectional view showing the optical waveguide device of the second embodiment, taken along a line B—B of FIG. 7.

FIGS. 7 and 8 show the second embodiment of the present invention, which is applied to an optical modulator. In FIG. 7, a reference numeral 11 represents a first transparent dielectric substrate having a predetermined index of refraction. A reference numeral 12 represents a second transparent dielectric substrate having an index of refraction different from that of the first transparent dielectric substrate 11. The difference of the index of refraction between two substrates 11, 12 can be obtained by changing an amount of impurity contained therein. This second transparent dielectric substrate 12 is formed thin compared with the first transparent dielectric substrate 11. A reference numeral 13 represents an inlet or outlet portion of an optical waveguide path, formed on the second transparent dielectric substrate 12 at opposite ends thereof. An intermediate portion of the optical waveguide path between the inlet and outlet portions 13, 13 is split symmetrically into two at the center of the second transparent dielectric substrate 12. One is a first bifurcated optical waveguide path 14, and the other is a second bifurcated optical waveguide path 15. These two bifurcated optical waveguide paths 14 and 15 are formed in parallel with each other. At opposite sides of the second bifurcated optical waveguide path 15, there is provided a pair of electrodes 16 and 17 of aluminum.

The first and second bifurcated optical waveguide paths 14, 15, having the same cross section of a trapezoid, constitute so-called ridges. The cross section of the first and second bifurcated waveguide paths 14, 15 is the same as that of the inlet and outlet portions 13, 13 of the optical waveguide path. A reference numeral 18 represents a light propagating region of an optical waveguide path.

The construction disclosed here is referred to as Mach-Zehnder type, in which a light entered from the inlet portion 13 is introduced into bifurcated two intermediate paths 14, 15, one 15 of which is applied with a certain voltage to change its index of refraction by using electrooptical effect. A propagation speed of the light, passing through the bifurcated waveguide path 15, changes due to the change off the index of refraction of the bifurcated waveguide path 15. With this change of propagation speed, two lights propagating in the first and second bifurcated intermediate paths 14, 15 are modified to be out of phase with each other. These two lights are merged into one again in the outlet portion 13. Thus merged light has a modified intensity compared with the original one. Thus, the optical modulation can be carried out in the Mach-Zehnder type optical waveguide device.

A monocrystal lithium niobate and a monocrystal lithium tantalate respectively having a large electrooptical effect are selectively used in this embodiment as the material constituting the first and second transparent dielectric substrates 1 and 2. The monocrystal lithium niobate has an index of refraction of 2.29 with respect to an ordinary light. On the other hand, the monocrystal lithium tantalate has an index of refraction of 2.18 with respect to the ordinary light.

If there is a difference equal to or more than 0.01 in index of refraction, it is possible to confine lights or electromagnetic waves in either of two substrates which has a greater index of refraction. In this embodiment, the second transparent dielectric substrate 12 is adjusted to be larger than the first transparent dielectric substrate 11 in index of refraction. In more detail, the first transparent dielectric substrate 11 contains impurity such as magnesium (Mg) of approximately $10^{20}/cm^3$. On the other hand, the second transparent dielectric substrate 12 contains no impurity. With this injection of impurity to the first transparent dielectric substrate 11, a refractive index difference of 0.01 can be obtained between two substrates 11, 12. Thus, a light entered into the second transparent dielectric substrate 12 can be confined in this thin layer. The thicknesses of the first and second transparent dielectric substrates 11, 12 are selected to 600μm and 7μm, respectively.

Furthermore, the ridge configuration of this embodiment is effective in the localized confinement of the propagation of lights or electromagnetic waves. Because, the portion right beneath the ridge has a larger effective index of refraction compared with other portion. In this embodiment, the specific dimension of the ridge is determined as follows: A height of the ridge is 3μm; a width of the waveguide path is 7μm; a length of the bifurcated portion of the waveguide path is 2 cm; and an whole length of the waveguide path is 3 cm.

The ridge configuration is further advantageous in that a center of the propagation, i.e. a portion at which an intensity of light or electromagnetic wave is strongest, is positioned almost identically with the center of the waveguide path formed beneath the ridge. Moreover, the shape of the propagation of lights or electromagnetic waves is similar to a circle. As the inlet and outlet portion 13, 13 of the waveguide path have the same circular constructions, the coupling efficiency with respect to an optical fiber, which has generally a circular core (approximately 10μm in a diameter), is greatly improved.

In fact, a coupling loss with respect to the optical fiber was less than 0.3–0.5 dB at one side in the case where an adhesive material whose index of refraction is appropriately adjusted is used to connect the optical fiber and the waveguide device of this embodiment.

Still further, the propagation loss of lights or electromagnetic waves can be suppressed to the least value because the transparent dielectric substrates used in this embodiment are made of pure monocrystal, which requires no ion-diffusion treatment. In more detail, a value equal to or less than 0.5 dB/cm was easily attained in the propagation loss.

Furthermore no optical damage was found, although the optical damage was measured by increasing the intensity of incident light from 0 dBm to 20 dBm. This good result is considered to be derived from the excellent property of the monocrystal substrate having very small electronic trap.

A light used in the measurement was a wavelength of 1.3μm.

Barium titanate, potassium niobate, and potassium titanophosphate are prospective materials which have similar electrooptical effect and can be equivalently used as a transparent dielectric substrate of the present invention instead of lithium niobate or lithium tantalate. The indices of refraction of barium titanate, potassium niobate, and potassium titanophosphate are 2.4, 2.2, and 1.7, respectively.

2.1. FIFTH METHOD

An example of the method of manufacturing the optical waveguide device of the second embodiment will be explained below with reference to FIGS. 11(a)–11(g).

Figure 11A:
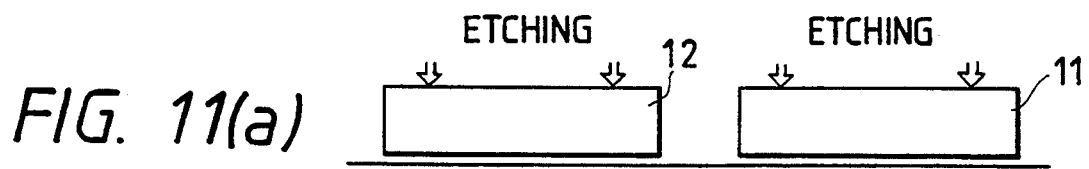
FIGS. 11(a)-11(g) are views showing a fifth example of the method of manufacturing the optical waveguide device, by which the optical waveguide device of the second embodiment is manufactured.
Figure 11B:
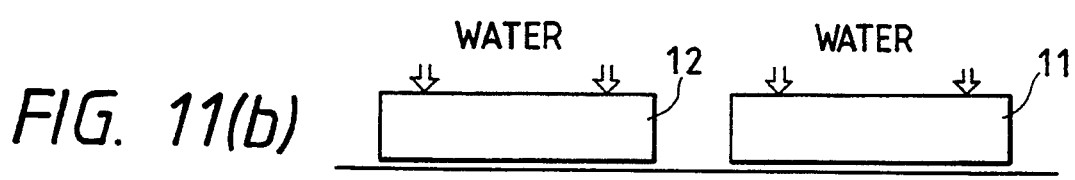
Figure 11C:
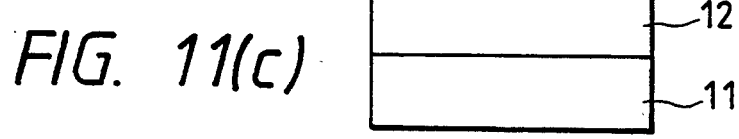

First of all, first and second transparent dielectric substrates 11 and 12, which are slightly different from each other in index of refraction, are prepared. The surfaces of these first and second transparent dielectric substrates 11 and 12, which have been ground and finished as mirror surfaces beforehand, are smoothed and cleaned. In practice, etchant containing hydrofluoric acid is used to clean the surfaces of the first and second transparent dielectric substrates 11 and 12 as shown in FIG. 11(a). Subsequently, the etched surfaces are watered as shown in FIG. 11(b). This watering treatment allows water components such as hydroxyl group, hydrogen, oxygen to adhere on the surfaces of the substrates 11, 12. Immediately after the watering treatment, both surfaces of the substrates 11, 12 are uniformly connected together as shown in FIG. 11(c) without using any organic adhesive material. Namely, this connection is direct-type connection achieved by the bonding power of hydroxyl group, hydrogen, oxygen ions adhering on the surface of the substrates 11, 12.

Figure 11D:
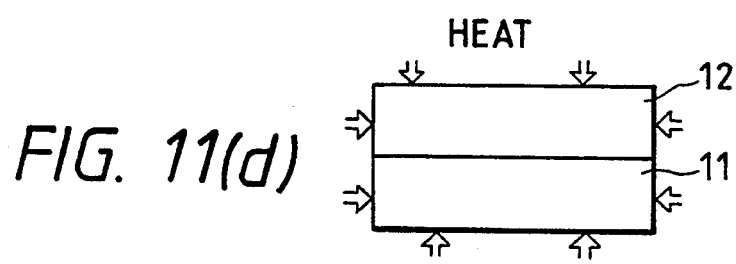

In turn, a heat treatment is adopted to the assembly of the substrates 11, 12, as shown in FIG. 11(d). The temperature is increased to a range of 100°–1100 ° C. This heat treatment ensures the connecting strength to be further increased. The reason is already described in the first method.

Figure 11E:
Figure 11F:
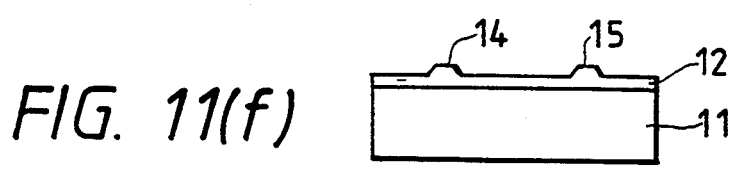
Figure 11G:
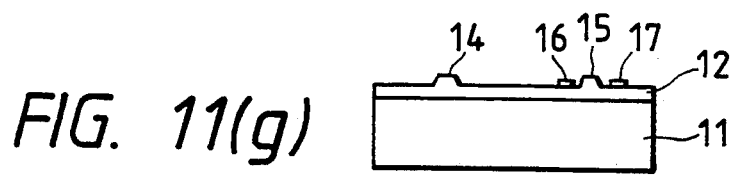

Next, in order to form an optical waveguide path, either of the substrates, i.e. the second transparent dielectric substrate 12 in the drawing, is thinned by the mechanical grind and etching as shown in FIG. 11(e). A thickness of the second substrate 12 is reduced to a level of 7μm. On the surface of the second substrate 12, there is then formed an etching mask corresponding to the Mach-Zehnder type optical waveguide structure shown in FIG. 7 by using photolithography. Thus, the portion other than ridges 14, 15 of the optical waveguide structure is removed off by etching as shown in FIG. 11(f). The depth formed by this etching is 3μm. Chrome is used as the mask. The etchant used here contains hydrofluoric acid. Thereafter, the mask is removed and a pair of electrodes 16, 17 is formed by the ordinary photolithography and etching techniques as shown in FIG. 11(g). In this manner, according to this fifth example of the manufacturing method, the optical waveguide device of the second embodiment can be obtained.

3. THIRD EMBODIMENT

Figure 9:
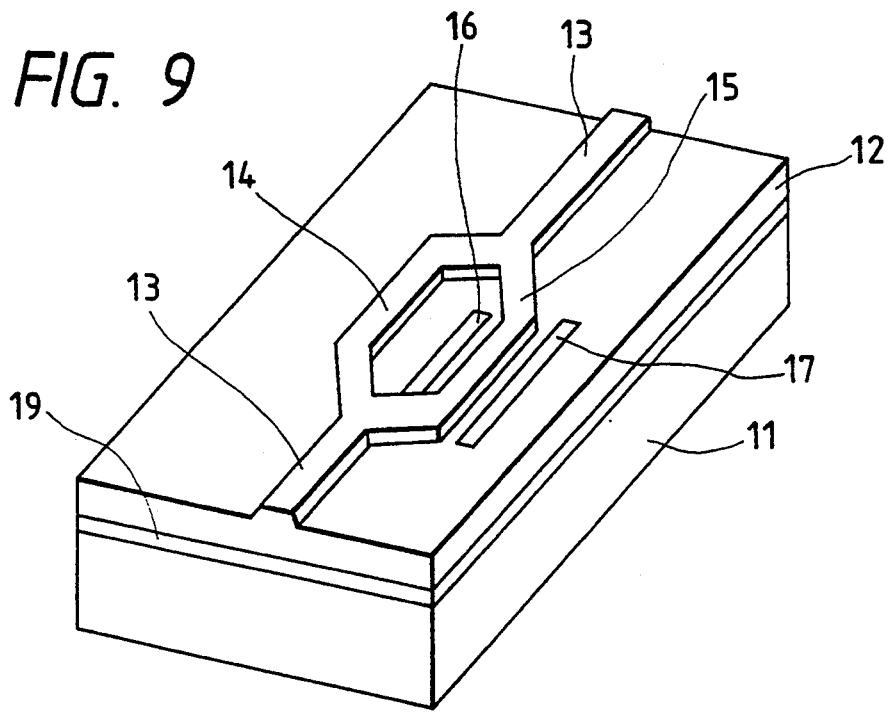
FIG. 9 is a perspective view showing an optical waveguide device adopted to an optical modulator in accordance with a third embodiment of the present invention.

FIG. 9 shows the third embodiment of the present invention, which is applied to an optical modulator. In FIG. 9, components suffixed by the reference numerals 11–17 are the same as those disclosed in FIG. 7 and therefore will no more be explained. A reference numeral 19 represents a glass layer, which interposes between the first and second transparent dielectric substrates 11, 12.

The index of refraction of the glass layer 19 is approximately 1.5. The thickness of the glass layer 19 is selected to be 100 nm to 1μm, which is far thin compared with that of the second transparent dielectric substrate 12. With this arrangement, it becomes possible to effectively confine lights or electromagnetic waves in the second transparent dielectric substrate 12 because of the refractive index difference between the first and second substrates 11, 12 as described in the second embodiment.

Substantially the same function and effect as the second embodiment can be obtained in this third embodiment. Especially almost identical properties will be obtained, if the thickness of the glass layer 19 is selected to be 0.5μm.

3.1. SIXTH METHOD

An example of the method of manufacturing the optical waveguide device of the third embodiment will be explained below with reference to FIGS. 12(a)–12(g).

Figure 12A:
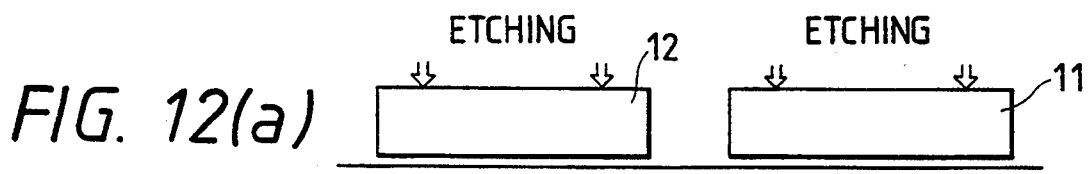
FIGS. 12(a)-12(g) are views showing a sixth example of the method of manufacturing the optical waveguide device, by which the optical waveguide device of the third embodiment is manufactured.
Figure 12B:
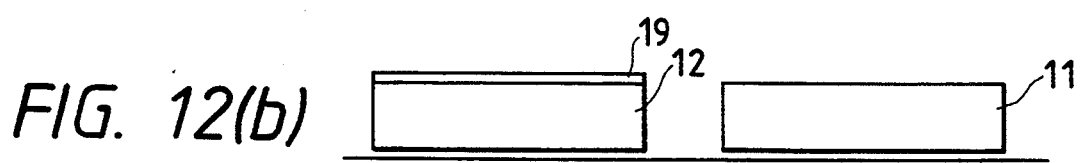

First of all, first and second transparent dielectric substrates 11 and 12, which are slightly different from each other in index of refraction, are prepared. The surfaces of these first and second transparent dielectric substrates 11 and 12, which have been ground and finished as mirror surfaces beforehand, are smoothed and cleaned. In practice, etchant containing hydrofluoric acid is used to clean the surfaces of the first and second transparent dielectric substrates 11 and 12 as shown in FIG. 12(a). Subsequently, a glass layer 19 is grown on at least either of the smoothed and cleaned surfaces of the first and second transparent dielectric substrates 11 and 12, as shown in FIG. 12(b). A conventional growth method such as spattering is used to form this glass layer 19. The thickness of the glass layer 19 is selected to be 0.3–0.6μm.

Figure 12C:
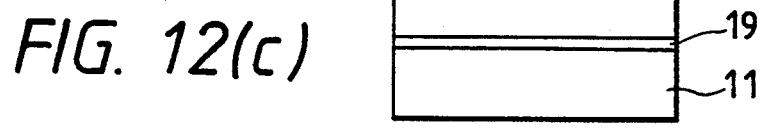

Then, both substrates 11, 12 are uniformly connected together through the glass layer 19 as shown in FIG. 12(c) without using any organic adhesive material.

Figure 12D:
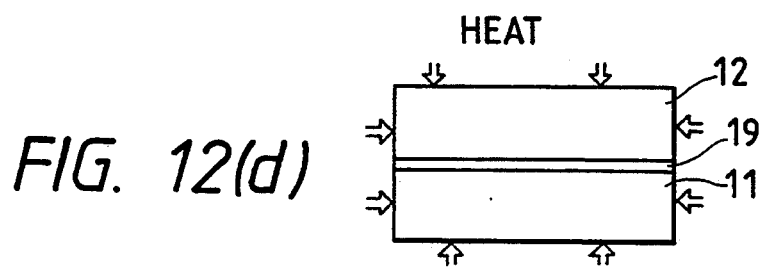

In turn, a heat treatment is adopted to the assembly of the substrates 11, 12 and the glass layer 19 interposing therebetween, as shown in FIG. 12(d). The temperature is increased to a point nearly equal to the melting point of the glass layer 19. This heat treatment ensures the connecting strength to be increased.

Figure 12E:
Figure 12F:
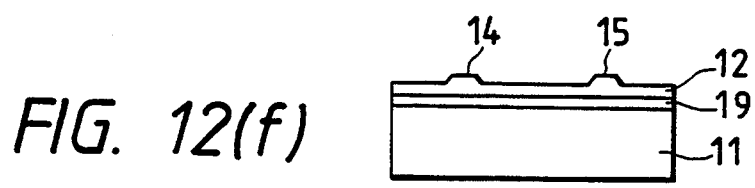
Figure 12G:
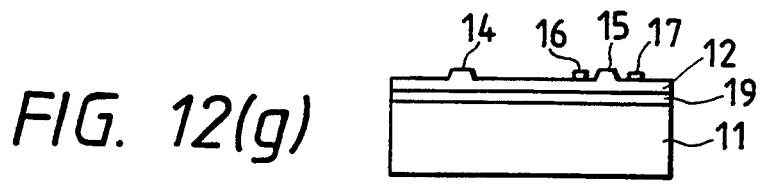

Next, in order to form an optical waveguide path, either of the substrates, i.e. the second transparent dielectric substrate 12 in the drawing, is thinned by the mechanical grind and etching as shown in FIG. 12(e). A thickness of the second substrate 12 is reduced to a level of 7μm. On the surface of the second substrate 12, there is then formed an etching mask corresponding to the Mach-Zehnder type optical waveguide structure shown in FIG. 9 by using photolithography. Thus, the portion other than ridges 14, 15 of the optical waveguide structure is removed off by etching as shown in FIG. 12(f). The depth formed by this etching is 3μm. Chrome is used as the mask. The etchant used here contains hydrofluoric acid. Thereafter, the mask is removed and a pair of electrodes 16, 17 is formed by the ordinary photolithography and etching techniques as shown in FIG. 12(g). In this manner, according to this sixth example of the manufacturing method, the optical waveguide device of the third embodiment can be obtained.

4. FOURTH EMBODIMENT

Figure 10:
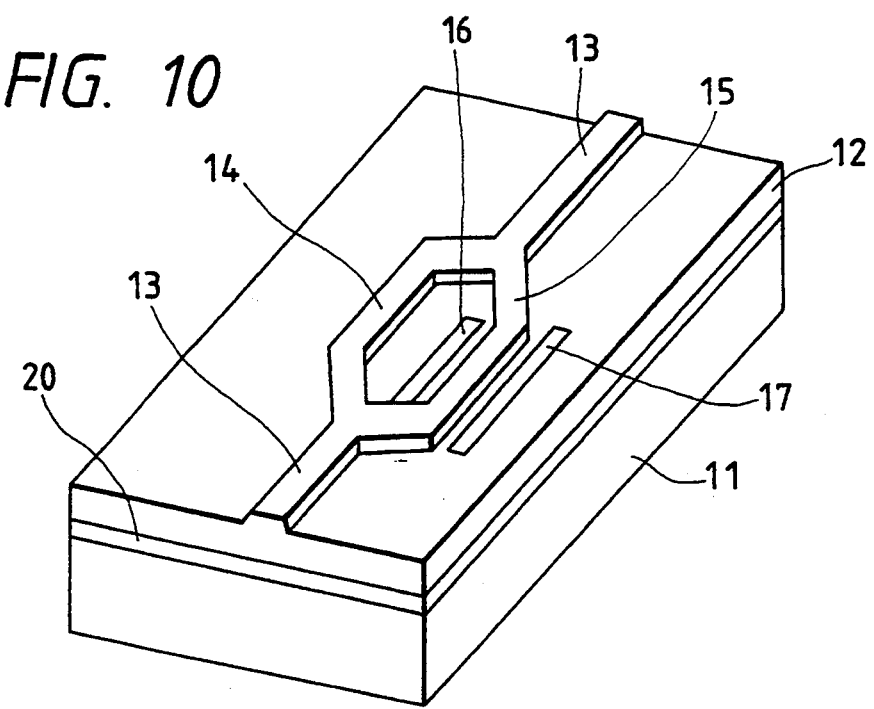
FIG. 10 is a perspective view showing an optical waveguide device adopted to an optical modulator in accordance with a fourth embodiment of the present invention.

FIG. 10 shows the fourth embodiment of the present invention, which is applied to an optical modulator. In FIG. 10, components suffixed by the reference numerals 11–17 are the same as those disclosed in FIG. 7 and therefore will no more be explained. A reference numeral 20 represents an intervening layer, which interposes between the first and second transparent dielectric substrates 11, 12.

The intervening layer 20 is constituted by a material selected from a group consisting of silicon, silicon compound, and metallic oxide such as polycrystal silicon, amorphous silicon, silicon oxide and silicon nitride. The index of refraction of the intervening layer 20 is different from that of the transparent dielectric substrates 11, 12. The thickness of the intervening layer 20 is selected to be 100 nm to 1μm, which is far thin compared with that of the second transparent dielectric substrate 12. With this arrangement, it becomes possible to effectively confine lights or electromagnetic waves in the second transparent dielectric substrate 12 because of the refractive index difference between the first and second substrates 11, 12 as described in the second embodiment.

Substantially the same function and effect as the second embodiment can be obtained in this fourth embodiment. Especially almost identical properties will be obtained, if the thickness of the intervening layer 20 is selected to be 0.5μm.

4.1. SEVENTH METHOD

An example of the method of manufacturing the optical waveguide device of the fourth embodiment will be explained below with reference to FIGS. 13(a)–13(h).

Figure 13A:
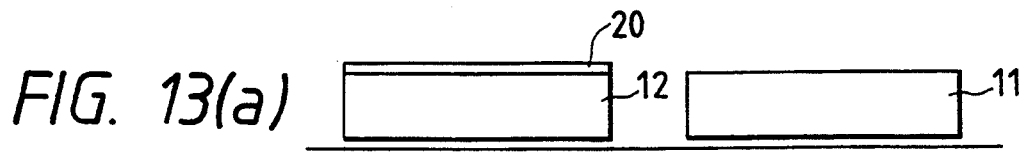
FIGS. 13(a)-13(h) are views showing a seventh example of the method of manufacturing the optical waveguide device by which the optical waveguide device of the fourth embodiment is manufactured.

First of all, first and second transparent dielectric substrates 11 and 12, which are slightly different from each other in index of refraction, are prepared. The surfaces of these first and second transparent dielectric substrates 11 and 12, which have been ground and finished as mirror surfaces beforehand, are smoothed and cleaned, for example, by etching. Subsequently, the intervening layer 20 is grown on at least either of the smoothed and cleaned surfaces of the first and second transparent dielectric substrates 11 and 12, as shown in FIG. 13(a). A conventional growth method such as chemical vapor deposition (CVD) or spattering is used to form this intervening layer 20. The thickness of the intervening layer 20 is selected to be 0.25–0.5μm.

Figure 13B:
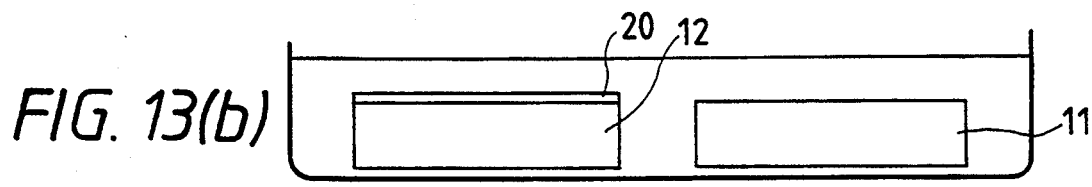
Figure 13C:
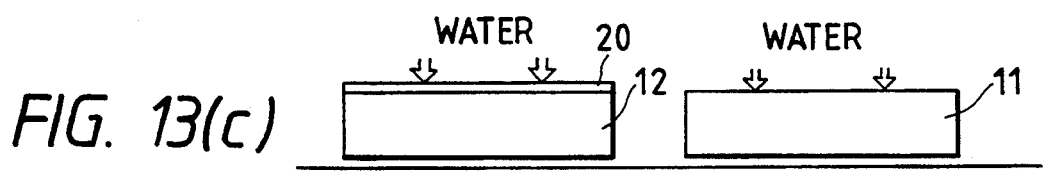
Figure 13D:
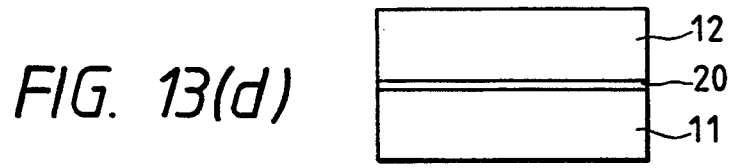

Thereafter, both surfaces to be bonded through the intervening layer 20, i.e. the upper surface of the intervening layer 20 and the upper surface of the first transparent dielectric substrate 11 in the drawing, are adopted a hydrophilic treatment, as shown in FIG. 13(b). Subsequently, the surfaces to be bonded are watered as shown in FIG. 13(c). Immediately after the watering treatment, both surfaces of the substrate 11 and the intervening layer 20 are uniformly connected together as shown in FIG. 13(d) without using any organic adhesive material.

Figure 13E:
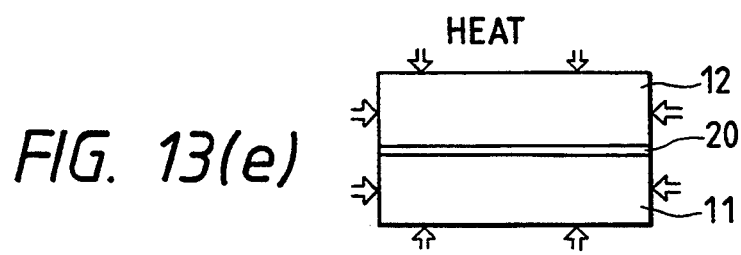

In turn, a heat treatment is adopted to the assembly of the substrates 11, 12 and the intervening layer 20 interposing therebetween, as shown in FIG. 13(e). The temperature is increased to a range of 100°–1100° C. . This heat treatment ensures the connecting strength to be increased.

Figure 13F:
Figure 13G:
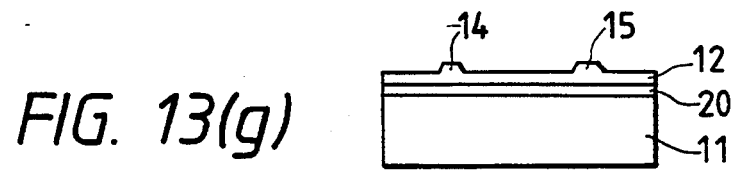
Figure 13H:
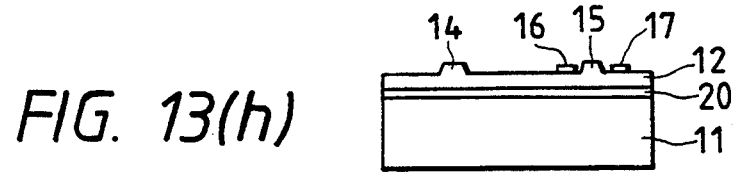

Next, in order to form an optical waveguide path, either of the substrates, i.e. the second transparent dielectric substrate 12 in the drawing, is thinned by the mechanical grind and etching as shown in FIG. 13(f). A thickness of the second substrate 12 is reduced to a level of 7μm. On the surface of the second substrate 12, there is then formed an etching mask corresponding to the Mach-Zehnder type optical waveguide structure shown in FIG. 10 by using photolithography. Thus, the portion other than ridges 14, 15 of the optical waveguide structure is removed off by etching as shown in FIG. 13(g). The depth formed by this etching is 3μm. Chrome is used as the mask. The etchant used here contains hydrofluoric acid. Thereafter, the mask is removed and a pair of electrodes 16, 17 is formed by the ordinary photolithography and etching techniques as shown in FIG. 13(h). In this manner, according to this seventh example of the manufacturing method, the optical waveguide device of the fourth embodiment can be obtained.

5. FIFTH EMBODIMENT

Figure 14:
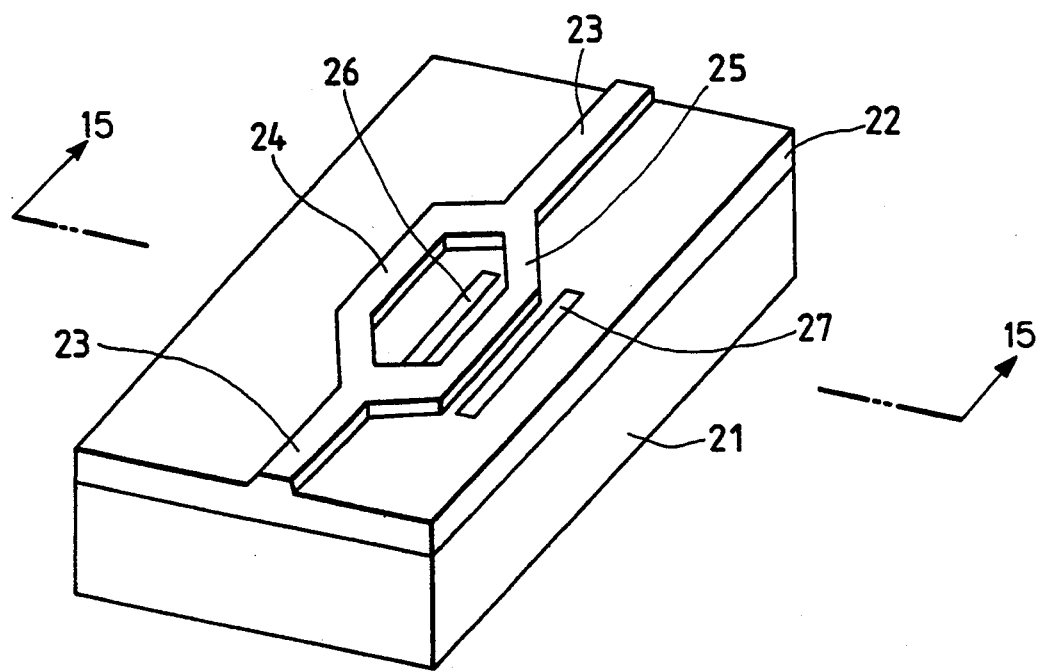
FIG. 14 is a perspective view showing an optical waveguide device adopted to an optical modulator in accordance with a fifth embodiment of the present invention.
Figure 15:
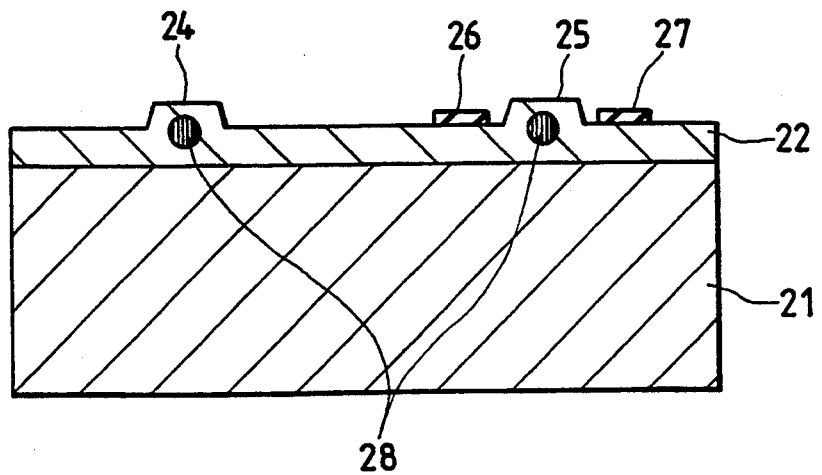
FIG. 15 is a cross-sectional view showing the optical waveguide device of the fifth embodiment, taken along a line C—C of FIG. 14.

FIGS. 14 and 15 show the fifth embodiment of the present invention, which is applied to an optical modulator. In FIG. 14, a reference numeral 21 represents a glass substrate. A reference numeral 22 represents a transparent dielectric substrate having an electrooptical effect. This second transparent dielectric substrate 12 is formed thin compared with the glass substrate 21. A reference numeral 23 represents an inlet or outlet portion of an optical waveguide path, formed on the transparent dielectric substrate 22 at opposite ends thereof. An intermediate portion of the optical waveguide path between the inlet and outlet portions 23, 23 is split symmetrically into two at the center of the transparent dielectric substrate 22. One is a first bifurcated optical waveguide path 24, and the other is a second bifurcated optical waveguide path 25. These two bifurcated optical waveguide paths 24 and 25 are formed in parallel with each other. At opposite sides of the second bifurcated optical waveguide path 25, there is provided a pair of electrodes 26 and 27 of aluminum.

The first and second bifurcated optical waveguide paths 24, 25, having the same cross section of a trapezoid, constitute so-called ridges. The cross section of the first and second bifurcated waveguide paths 24, 25 is the same as that of the inlet and outlet portions 23, 23 of the optical waveguide path. A reference numeral 28 represents a light propagating region of an optical waveguide path.

The construction disclosed here is referred to as Mach-Zehnder type, in which a light entered from the inlet portion 23 is introduced into bifurcated two intermediate paths 24, 25, one 25 of which is applied with a certain voltage to change its index of refraction by using electrooptical effect. A propagation speed of the light, passing through the bifurcated waveguide path 25, changes due to the change of the index of refraction of the bifurcated waveguide path 25. With this change of propagation speed, two lights propagating in respective first and second bifurcated intermediate paths 24, 25 are modified to be out of phase with each other. These two lights are merged into one again in the outlet portion 23. Thus merged light has a modified intensity compared with the original one. Thus, the optical modulation can be carried out in the Mach-Zehnder type optical waveguide device.

A monocrystal lithium niobate and a monocrystal lithium tantalate respectively having a large electrooptical effect are selectively used in this embodiment as the material constituting the transparent dielectric substrate 22. The monocrystal lithium niobate has an index of refraction of 2.29 with respect to an ordinary light. On the other hand, the monocrystal lithium tantalate has an index of refraction of 2.18 with respect to the ordinary light.

If there is a certain difference in index of refraction, it is possible to confine lights or electromagnetic waves in either of two substrates which has a greater index of refraction. The transparent dielectric substrate 22 used in this embodiment has a greater index of refraction compared with that of the glass substrate 21 which is generally in a range of 1.4–1.6. Thus, a light entered into the transparent dielectric substrate 22 can be confined in this thin layer. The thicknesses of the glass substrate 21 and the transparent dielectric substrate 21 are selected to 1 mm and 7 mm, respectively.

Furthermore, the ridge configuration of this embodiment is effective in the localized confinement of the propagation of lights or electromagnetic waves. Because, the portion right beneath the ridge has a larger effective index of refraction compared with other portion. In this embodiment, the specific dimension of the ridge is determined as follows: A height of the ridge is 3μm; a width of the waveguide path is 10μm; a length of the bifurcated portion of the waveguide path is 2 cm; and an whole length of the waveguide path is 4 cm.

The ridge configuration is further advantageous in that a center of the propagation, i.e. a portion at which an intensity of light or electromagnetic wave is strongest, is positioned almost identically with the center of the waveguide path formed beneath the ridge. Moreover, the shape of the propagation of lights or electromagnetic waves is similar to a circle. As the inlet and outlet portion 33, 13 of the waveguide path have the same circular constructions, the coupling efficiency with respect to an optical fiber, which has generally a circular core (approximately 10μm in a diameter), is greatly improved.

In fact, a coupling loss with respect to the optical fiber was less than 0.3–0.5 dB at one side in the case where an adhesive material whose index of refraction is appropriately adjusted is used to connect the optical fiber and the waveguide device of this embodiment.

Still further, the propagation loss of lights or electromagnetic waves can be suppressed to the least value because the transparent dielectric substrates used in this embodiment are made of pure monocrystal, which requires no ion-diffusion treatment. In more detail, a value equal to or less than 0.5 dB/cm was easily attained in the propagation loss.

Furthermore no optical damage was found, although the optical damage was measured by increasing the intensity of incident light from 0 dBm to 20 dBm. This good result is considered to be derived from the excellent property of the monocrystal substrate having very small electronic trap.

A light used in the measurement was a wavelength of 1.3μm.

Barium titanate, potassium niobate, and potassium titanophosphate are prospective materials which have similar electrooptical effect and can be equivalently used as a transparent dielectric substrate of the present invention instead of lithium niobate or lithium tantalate. The indices of refraction of barium titanate, potassium niobate, and potassium titanophosphate are 2.4, 2.2, and 1.7, respectively.

5.1. EIGHTH METHOD

An example of the method of manufacturing the optical waveguide device of the fifth embodiment will be explained below with reference to FIGS. 18(a)–18(g).

Figure 18A:
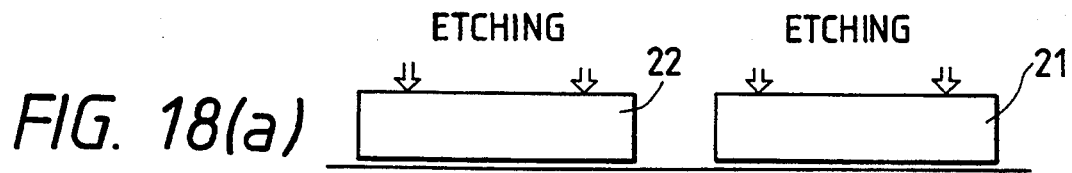
FIGS. 18(a)-18(g) are views showing an eighth example of the method of manufacturing the optical waveguide device, by which the optical waveguide device of the fifth embodiment is manufactured.
Figure 18B:
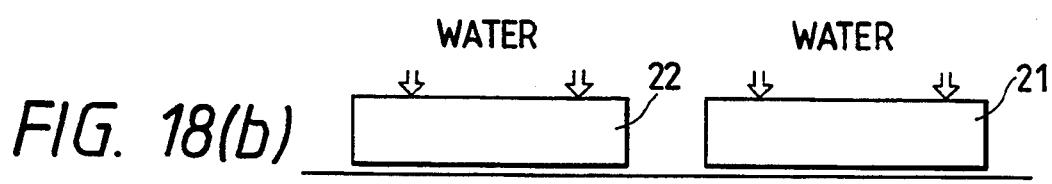
Figure 18C:
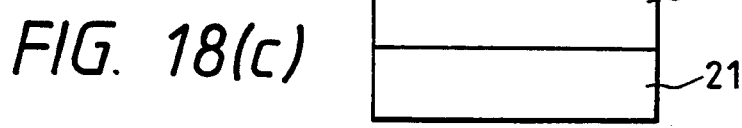

First of all, the glass substrate 21 and the transparent dielectric substrates 22 are prepared. The surfaces; of these substrates 21 and 12, which have been ground and finished as mirror surfaces beforehand, are smoothed and cleaned. In practice, etchant containing hydrofluoric acid is; used to clean the surfaces of these two substrates 21 and 22 as shown in FIG. 18(a). Subsequently, the etched surfaces are watered as shown in FIG. 18(b). This watering treatment allows water components such as hydroxyl group, hydrogen, oxygen to adhere on the surfaces of the substrates 21, 22. Immediately after the watering treatment, both surfaces of the substrates 21, 22 are uniformly connected together as shown in FIG. 18(c) without using any organic adhesive material. Namely, this connection is direct-type connection achieved by the bonding power of hydroxyl group, hydrogen, oxygen ions adhering on the surface of the substrates 21, 22.

Figure 18D:
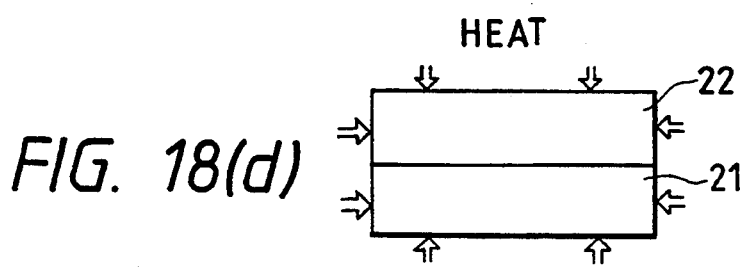

In turn, a heat treatment is adopted to the assembly of the substrates 21, 22, as shown in FIG. 18(d). The temperature is increased to a range of 100°–1100° C. This heat treatment ensures the connecting strength to be further increased.

Figure 18E:
Figure 18F:
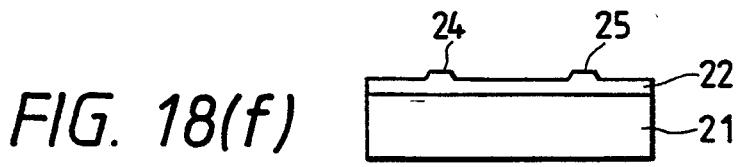
Figure 18G:
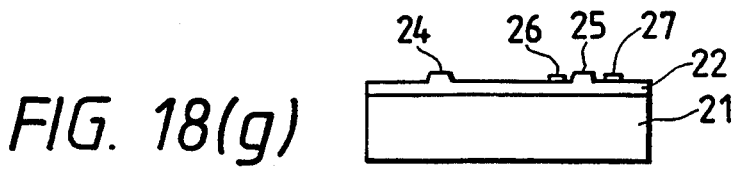

Next, in order to form an optical waveguide path, either of the substrates, i.e. the transparent dielectric substrate 22 in the drawing, is thinned by the mechanical grind and etching as shown in FIG. 18(e). A thickness of the substrate 22 is reduced to a level of 10μm. On the surface of the substrate 22, there is then formed an etching mask corresponding to the Mach-Zehnder type optical waveguide structure shown in FIG. 14 by using photolithography. Thus, the portion other than ridges 24, 25 of the optical waveguide structure is removed off by etching as shown in FIG. 18(f). The depth formed by this etching is 3μm. Chrome is used as the mask. The etchant used here contains hydrofluoric acid. Thereafter, the mask is removed and a pair of electrodes 26, 27 is formed by the ordinary photolithography and etching techniques as shown in FIG. 18(g). In this manner, according to this eighth example of the manufacturing method, the optical waveguide device of the fifth embodiment can be obtained.

6. SIXTH EMBODIMENT

Figure 16:
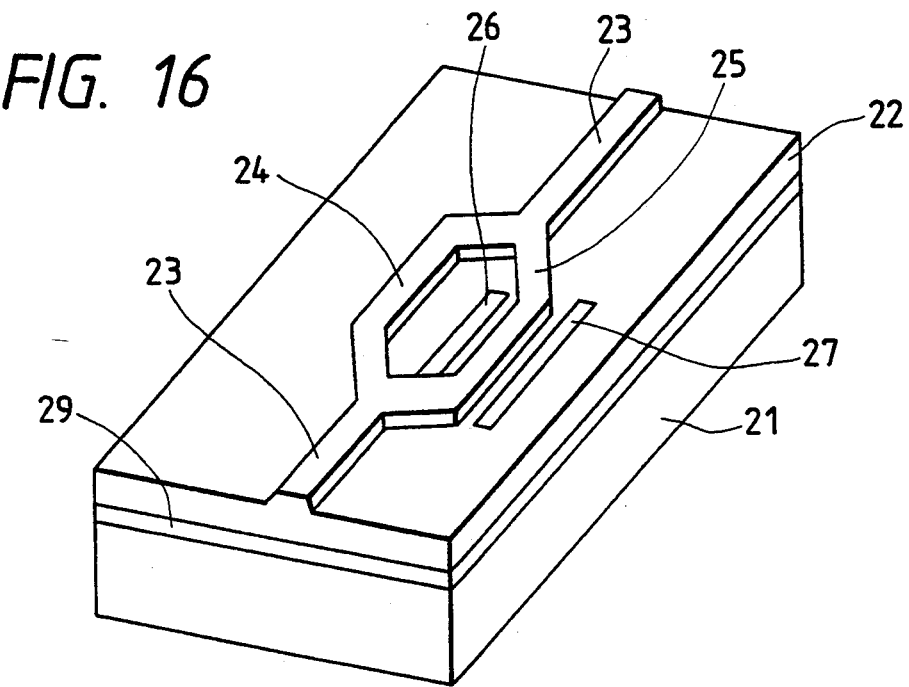
FIG. 16 is a perspective view showing an optical waveguide device adopted to an optical modulator in accordance with a sixth embodiment of the present invention.

FIG. 16 shows the sixth embodiment of the present invention, which is applied to an optical modulator. In FIG. 16, components suffixed by the reference numerals 21–27 are the same as those disclosed in FIG. 14 and therefore will no more be explained. A reference numeral 29 represents a glass layer having a low melting point, which interposes between the glass substrate 21 and the transparent dielectric substrates 22.

The index of refraction of the glass layer 29 is approximately 1.5. The thickness of the glass layer 29 is selected to be 100 nm to 1μm, which is far thin compared with that of the transparent dielectric substrate 22. With this arrangement, it becomes possible to effectively confine lights or electromagnetic waves in the transparent dielectric substrate 22 because of the refractive index difference between the first and second substrates 21, 22.

Substantially the same function and effect as the fifth embodiment can be obtained in this sixth embodiment. Especially almost identical properties will be obtained, if the thickness of the glass layer 29 is selected to be 0.5μm.

6.1. NINTH METHOD

An example of the method of manufacturing the optical waveguide device of the sixth embodiment will be explained below with reference to FIGS. 19(a)-19(g).

Figure 19A:
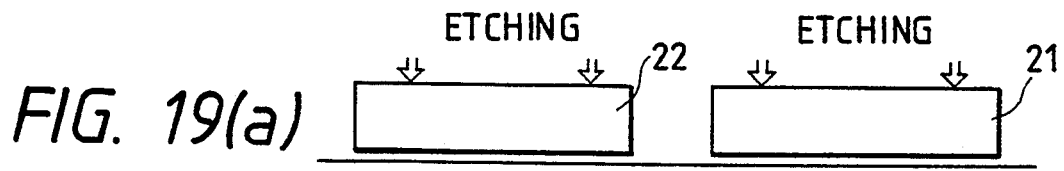
FIGS. 19(a)-19(g) are views showing a ninth example of the method of manufacturing the optical waveguide device, by which the optical waveguide device of the sixth embodiment is manufactured.
Figure 19B:
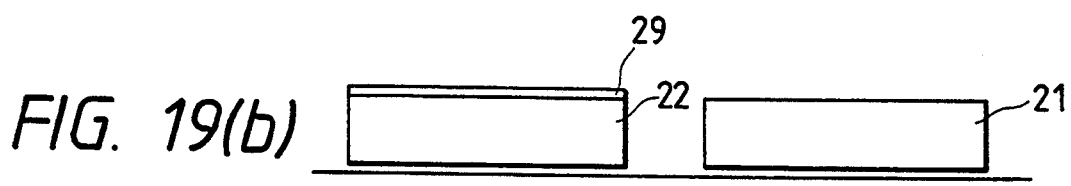

First of all, the glass substrate 21 and the transparent dielectric substrates 22 are prepared. The surfaces of these substrates 21 and 22, which have been ground and finished as mirror surfaces beforehand, are smoothed and cleaned, for example, by etching as shown in FIG. 19(a). Subsequently, a glass layer 29 having a low melting point is grown on at least either of the smoothed and cleaned surfaces of the substrates 21 and 22, as shown in FIG. 19(b). A conventional growth method such as spattering is used to form this glass layer 29. The thickness of the glass layer 29 is selected to be 0.3–0.6 $\mu$m.

Figure 19C:
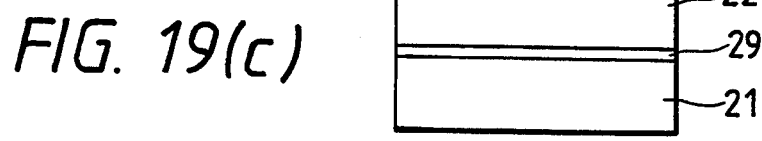

Then, both substrates 21, 22 are uniformly connected together through the glass layer 29 as shown in FIG. 19(c) without using any organic adhesive material.

Figure 19D:
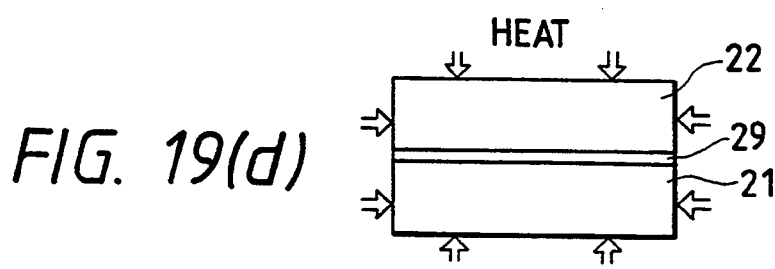

In turn, a heat treatment is adopted to the assembly of the substrates 21, 22 and the glass layer 29 interposing therebetween, as shown in FIG. 19(d). The temperature is increased to a point nearly equal to the melting point of the glass layer 29. This heat treatment ensures the connecting strength to be increased. The thickness of the glass layer 29 may vary depending on the temperature.

Figure 19E:
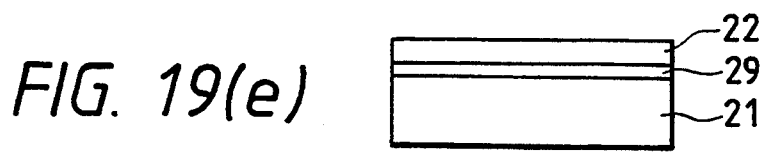
Figure 19F:
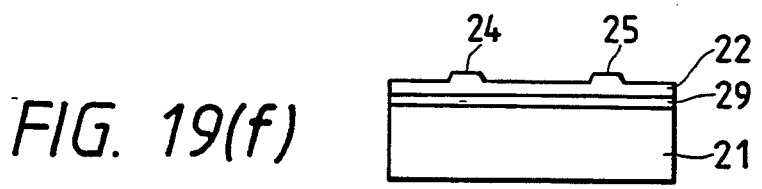
Figure 19G:
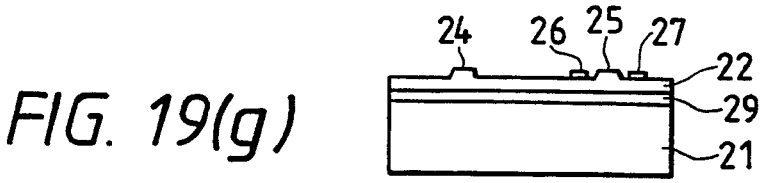

Next, in order to form an optical waveguide path, either of the substrates, i.e. the transparent dielectric substrate 22 in the drawing, is thinned by the mechanical grind and etching as shown in FIG. 19(e). A thickness of the substrate 22 is reduced to a level of 10 $\mu$m. On the surface of the substrate 22, there is then formed an etching mask corresponding to the Mach-Zehnder type optical waveguide structure shown in FIG. 16 by using photolithography. Thus, the portion other than ridges 24, 25 of the optical waveguide structure is removed off by etching as shown in FIG. 19(f). The depth formed by this etching is 3 $\mu$m. Chrome is used as the mask. The etchant used here contains hydrofluoric acid. Thereafter, the mask is removed and a pair of electrodes 26, 27 is formed by the ordinary photolithography and etching techniques as shown in FIG. 19(g). In this manner, according to this ninth example of the manufacturing method, the optical waveguide device of the sixth embodiment can be obtained.

7. SEVENTH EMBODIMENT

FIG. 18 shows the seventh embodiment of the present invention, which is applied to an optical modulator. In FIG. 18, components suffixed by the reference numeral 21-27 are the same as those disclosed in FIG. 14 and therefore will no more be explained. A reference numeral 30 represents an intervening layer, which interposes between the glass substrate 21 and the transparent dielectric substrates 22.

The intervening layer 30 is constituted by a material selected from a group consisting of silicon, silicon compound, and metallic oxide such as polycrystal silicon, amorphous silicon, silicon oxide and silicon nitride. The thickness of the intervening layer 30 is selected to be 100 nm to 1 $\mu$m, which is far thin compared with that of the transparent dielectric substrate 22. With this arrangement, it becomes possible to effectively confine lights or electromagnetic waves in the transparent dielectric substrate 22 because of the refractive index difference between the substrates 21, 22.

Substantially the same function and effect as the fifth embodiment can be obtained in this seventh embodiment. Especially almost identical properties will be obtained, if the thickness of the intervening layer 30 is selected to be 0.5 $\mu$m.

7.1. TENTH METHOD

An example of the method of manufacturing the optical waveguide device of the seventh embodiment will be explained below with reference to FIGS. 20(a)-20(h).

Figure 20A:
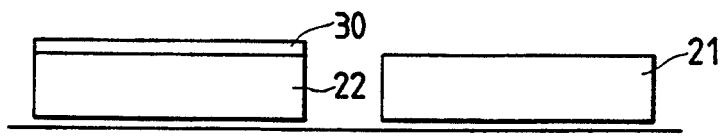
FIGS. 20(a)-20(h) are views showing a tenth example of the method of manufacturing the optical waveguide device, by which the optical waveguide device of the seventh embodiment is manufactured.

First of all, the glass substrate 21 and the transparent dielectric substrates 22 are prepared. The surfaces of these substrates 21 and 22, which have been ground and finished as mirror surfaces beforehand, are smoothed and cleaned, for example, by etching. Subsequently, the intervening layer 30 is grown on at least either of the smoothed and cleansed surfaces of the substrates 21 and 22, as shown in FIG. 20(a). A conventional growth method such as chemical vapor deposition (CVD) or spattering is used to form this intervening layer 30. The thickness of the intervening layer 30 is selected to be 0.25–0.5 $\mu$m.

Figure 20B:
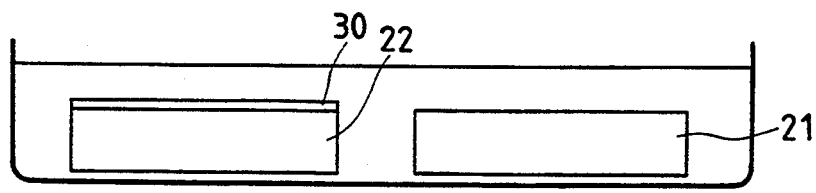
Figure 20C:
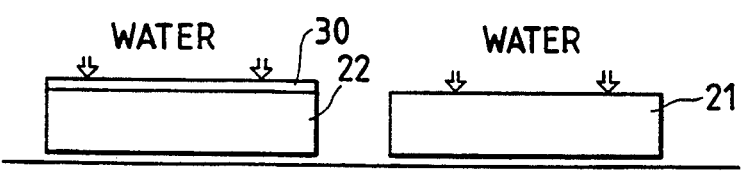
Figure 20D:
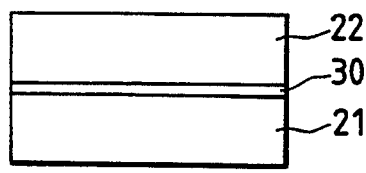

Thereafter, both surfaces to be bonded through the intervening layer 30, i.e. the upper surface of the intervening layer 30 and the upper surface of the transparent dielectric substrate 21 in the drawing, are adopted a hydrophilic treatment, as shown in FIG. 20(b). Subsequently, the surfaces to be bonded are watered as shown in FIG. 20(c). Immediately after the watering treatment, both surfaces of the substrate 21 and the intervening layer 30 are uniformly connected together as shown in FIG. 20(d) without using any organic adhesive material.

Figure 20E:
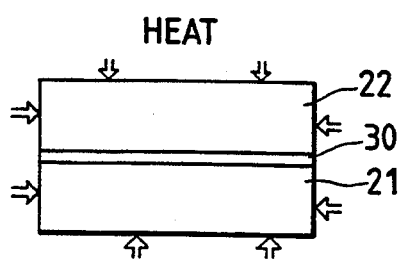

In turn, a heat treatment is adopted to the assembly of the substrates 21, 22 and the intervening layer 30 interposing therebetween, as shown in FIG. 20(e). The temperature is increased to a range of 100°–1100° C. This heat treatment ensures the connecting strength to be increased.

Figure 17:
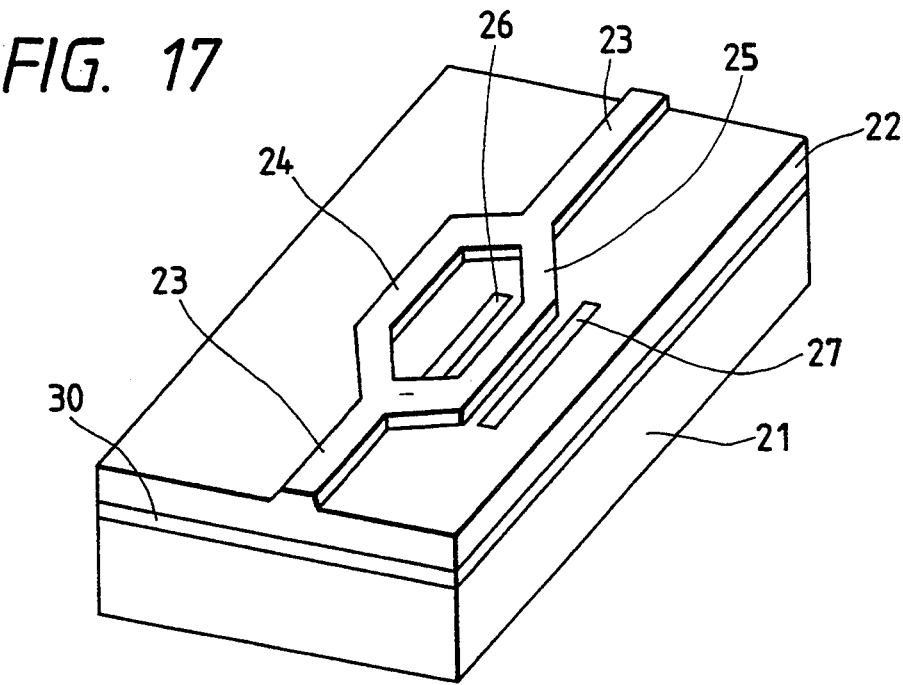
FIG. 17 is a perspective view showing an optical waveguide device adopted to an optical modulator in accordance with a seventh embodiment of the present invention.
Figure 20F:
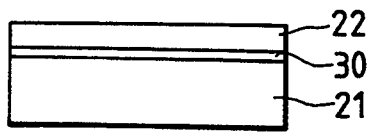
Figure 20G:
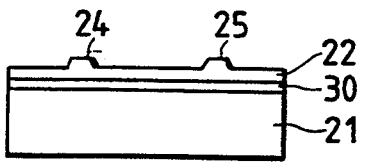
Figure 20H:
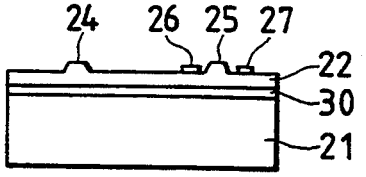

Next, in order to form an optical waveguide path, either of the substrates, i.e. the second transparent dielectric substrate 22 in the drawing, is thinned by the mechanical grind and etching as shown in FIG. 20(f). A thickness of the substrate 22 is reduced to a level of 10 $\mu$m. On the surface of the substrate 22, there is then formed an etching mask corresponding to the Mach-Zehnder type optical waveguide structure shown in FIG. 17 by using photolithography. Thus, the portion other than ridges 24, 25 of the optical waveguide structure is removed off by etching as shown in FIG. 20(g). The depth formed by this etching is 3 $\mu$m. Chrome is used as the mask. The etchant used here contains hydrofluoric acid. Thereafter, the mask is removed and a pair of electrodes 26, 27 is formed by the ordinary photolithography and etching techniques as shown in FIG. 20(h). In this manner, according to this tenth example of the manufacturing method, the optical waveguide device of the seventh embodiment can be obtained.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An optical waveguide device comprising:
   a first transparent monocrystalline dielectric substrate having a predetermined index of refraction and a predetermined coefficient of thermal expansion, said first transparent monocrystalline dielectric substrate having opposite first and second surfaces;

a second transparent monocrystalline dielectric substrate having the same index of refraction and coefficient of thermal expansion as said first transparent monocrystalline dielectric substrate, said second transparent monocrystalline dielectric substrate having opposite first and second surfaces, said first surface of second transparent monocrystalline dielectric substrate having a non-monocrystalline intervening layer having an index of refraction smaller than said index of refraction of said first and second transparent monocrystalline dielectric substrates;

said first surface of said first transparent monocrystalline dielectric substrate being directly bonded onto opposite surface of said non-monocrystalline intervening layer on said first surface of said second transparent monocrystalline dielectric substrate with coupling of hydrogen or hydroxyl group; and an optical waveguide path formed at a portion adjacent to said non-monocrystalline intervening layer in at least either of said first and second transparent monocrystalline dielectric substrates, wherein light is confined by the difference of refractive indexes between said first and second transparent monocrystalline dielectric substrates and said non-monocrystalline intervening layer.

2. An optical waveguide in accordance with claim 1, wherein said first and second transparent monocrystalline dielectric substrates are made of electrooptical material.

3. An optical waveguide in accordance with claim 2, wherein said first and second transparent monocrystalline dielectric substrates are made of lithium niobate or lithium tantalate.

4. An optical waveguide in accordance with claim 1, wherein said non-monocrystalline intervening layer is made of metallic oxide.

5. An optical waveguide in accordance with claim 1, wherein said non-monocrystalline intervening layer includes silicon.

6. An optical waveguide in accordance with claim 1, wherein said non-monocrystalline intervening layer is made of silicon dioxide or silicon nitride.

7. An optical waveguide in accordance with claim 1, wherein said non-monocrystalline intervening layer is made of glass.

8. An optical waveguide in accordance with claim 1, further comprising:
a thicker portion provided in at least either of said first and second transparent monocrystalline dielectric substrates, wherein light is three-dimensionally confined.

9. An optical waveguide in accordance with claim 1, wherein said non-monocrystalline intervening layer has a thickness more than one wavelength of light to be confined.

10. An optical waveguide device comprising:
a first transparent monocrystalline dielectric substrate having a predetermined index of refraction and a predetermined coefficient of thermal expansion, said first transparent monocrystalline dielectric substrate having opposite first and second surfaces;

a second transparent monocrystalline dielectric substrate having the same index of refraction and coefficient of thermal expansion as said first transparent monocrystalline dielectric substrate, said second transparent monocrystalline dielectric substrate having opposite first and second surfaces, said first surface of second transparent monocrystalline dielectric substrate having a non-monocrystalline intervening layer having an index refraction smaller than said index of refraction of said first and second transparent monocrystalline dielectric substrates;

said first surface of said first transparent monocrystalline dielectric substrate being directly bonded onto opposite surface of said non-monocrystalline intervening layer on said first surface of said second transparent monocrystalline dielectric substrate with coupling of oxygen and component atoms of said first transparent monocrystalline dielectric substrate and said non-monocrystalline intervening layer; and an optical waveguide path formed at a portion adjacent to said non-monocrystalline intervening layer in at least either of said first and second transparent monocrystalline dielectric substrates, wherein light is confined by the difference of refractive indexes between said first and second transparent monocrystalline dielectric substrates and said non-monocrystalline intervening layer.

11. An optical waveguide in accordance with claim 10, wherein said first and second transparent monocrystalline dielectric substrates are made of electrooptical material.

12. An optical waveguide in accordance with claim 11, wherein said first and second transparent monocrystalline dielectric substrates are made of lithium niobate or lithium tantalate.

13. An optical waveguide in accordance with claim 10, wherein said non-monocrystalline intervening layer is made of metallic oxide.

14. An optical waveguide in accordance with claim 10, wherein said non-monocrystalline intervening layer includes silicon.

15. An optical waveguide in accordance with claim 10, wherein said non-monocrystalline intervening layer is made of silicon dioxide or silicon nitride.

16. An optical waveguide in accordance with claim 10, wherein said non-monocrystalline intervening layer is made of glass.

17. An optical waveguide in accordance with claim 10, further comprising:
a thicker portion provided in at least either of said first and second transparent monocrystalline dielectric substrates, wherein light is three-dimensionally confined.

18. An optical waveguide in accordance with claim 10, wherein said non-monocrystalline intervening layer has a thickness more than one wavelength of light to be confined.

19. An optical waveguide device comprising:
a first transparent monocrystalline dielectric substrate having a predetermined index of refraction, said first transparent monocrystalline dielectric substrate having opposite first and second surfaces;

a second transparent monocrystalline dielectric substrate, made of the same material as said first transparent monocrystalline dielectric substrate, having an index of refraction larger than said first transparent monocrystalline dielectric substrate due to difference of contained impurities in said first and second transparent monocrystalline dielectric substrate, having opposite first and second surfaces;

said first surface of said first transparent monocrystalline dielectric substrate being directly bonded onto said first surface of said second transparent monocrystalline dielectric substrate with coupling of hydrogen or hydroxyl group; and an optical waveguide path formed in said second transparent monocrystalline dielectric substrate, wherein light is confined by the difference of refractive indexes between said first and second transparent monocrystalline dielectric substrates.

20. An optical waveguide in accordance with claim 19, wherein said first and second transparent monocrystalline dielectric substrates are made of electrooptical material.

21. An optical waveguide in accordance with claim 20, wherein said first and second transparent monocrystalline dielectric substrates are made of lithium niobate or lithium tantalate.

22. An optical waveguide in accordance with claim 19, further comprising:

a thicker portion provided in said second transparent monocrystalline dielectric substrate, wherein light is three-dimensionally confined.

23. An optical waveguide device comprising:

a first transparent monocrystalline dielectric substrate having a predetermined index of refraction, said first transparent monocrystalline dielectric substrate having opposite first and second surfaces;

a second transparent monocrystalline dielectric substrate, made of the same material as said first transparent monocrystalline dielectric substrate, having an index of refraction larger than said first transparent monocrystalline dielectric substrate due to difference of contained impurities in said first and second transparent monocrystalline dielectric substrate, having opposite first and second surfaces;

said first surface of said first transparent monocrystalline dielectric substrate being directly bonded onto said first surface of said second transparent monocrystalline dielectric substrate with coupling of oxygen and component atoms of said first and second transparent monocrystalline dielectric substrates; and an optical waveguide path formed in said second transparent monocrystalline dielectric substrate, wherein light is confined by the difference of refractive indexes between said first and second transparent monocrystalline dielectric substrates.

24. An optical waveguide in accordance with claim 23, wherein said first and second transparent monocrystalline dielectric substrates are made of electrooptical material.

25. An optical waveguide in accordance with claim 24, wherein said first and second transparent monocrystalline dielectric substrates are made of lithium niobate or lithium tantalate.

26. An optical waveguide in accordance with claim 23, further comprising:

a thicker portion provided in said second transparent monocrystalline dielectric substrate, wherein light is three-dimensionally confined.

27. An optical waveguide device comprising:

a first transparent monocrystalline dielectric substrate having a predetermined index of refraction, said first transparent monocrystalline dielectric substrate having opposite first and second surfaces;

a second transparent monocrystalline dielectric substrate, made of the same material as said first transparent monocrystalline dielectric substrate, having an index of refraction different from said first transparent monocrystalline dielectric substrate due to difference of contained impurities in said first and second transparent monocrystalline dielectric substrate, having opposite first and second surfaces, said first surface of second transparent monocrystalline dielectric substrate having a non-monocrystalline intervening layer having an index of refraction smaller than said index of refraction of said first and second transparent monocrystalline dielectric substrates;

said first surface of said first transparent monocrystalline dielectric substrate being directly bonded onto opposite surface of said non-monocrystalline intervening layer on said first surface of said second transparent monocrystalline dielectric substrate with coupling of hydrogen or hydroxyl group; and an optical waveguide path formed at a portion adjacent to said non-monocrystalline intervening layer in either substrate having a larger index of refraction of said first and second transparent monocrystalline dielectric substrates, wherein light is confined by the difference of refractive indexes among said first and second transparent monocrystalline dielectric substrates and said non-monocrystalline intervening layer.

28. An optical waveguide in accordance with claim 27, wherein said first and second transparent monocrystalline dielectric substrates are made of electrooptical material.

29. An optical waveguide in accordance with claim 28, wherein said first and second transparent monocrystalline dielectric substrates are made of lithium niobate or lithium tantalate.

30. An optical waveguide in accordance with claim 27, wherein said non-monocrystalline intervening layer is made of metallic oxide.

31. An optical waveguide in accordance with claim 27, wherein said non-monocrystalline intervening layer includes silicon.

32. An optical waveguide in accordance with claim 27, wherein said non-monocrystalline intervening layer is made of silicon dioxide or silicon nitride.

33. An optical waveguide in accordance with claim 27, wherein said non-monocrystalline intervening layer is made of glass.

34. An optical waveguide in accordance with claim 27, further comprising:

a thicker portion provided in either substrate having a larger index of refraction of said first and second transparent monocrystalline dielectric substrates, wherein light is three-dimensionally confined.

35. An optical waveguide in accordance with claim 27, wherein said non-monocrystalline intervening layer has a thickness more than one wavelength of light to be confined.

36. An optical waveguide device comprising:

a first transparent monocrystalline dielectric substrate having a predetermined index of refraction, said first transparent monocrystalline dielectric substrate having opposite first and second surfaces;

a second transparent monocrystalline dielectric substrate, made of the same material as said first transparent monocrystalline dielectric substrate, having an index of refraction different from said first transparent monocrystalline dielectric substrate due to difference of contained impurities in said first and second transparent monocrystalline dielectric substrate, having opposite first and second surfaces, said first surface of second transparent monocrystalline dielectric substrate having a non-monocrystalline intervening layer having an index of refraction smaller than said index of refraction of said first and second transparent monocrystalline dielectric substrates;

said first surface of said first transparent monocrystalline dielectric substrate being directly bonded onto opposite surface of said non-monocrystalline intervening layer on said first surface of said second transparent monocrystalline dielectric substrate with coupling of oxygen and component atoms of said first transparent monocrystalline dielectric substrate and said non-monocrystalline intervening layer; and an optical waveguide path formed at a portion adjacent to said non-monocrystalline intervening layer in either substrate having a larger index of refraction of said first and second transparent monocrystalline dielectric substrates, wherein light is confined by the difference of refractive indexes among said first and second transparent monocrystalline dielectric substrates and said non-monocrystalline intervening layer.

37. An optical waveguide in accordance with claim 36, wherein said first and second transparent monocrystalline dielectric substrates are made of electrooptical material.

38. An optical waveguide in accordance with claim 37, wherein said first and second transparent monocrystalline dielectric substrates are made of lithium niobate or lithium tantalate.

39. An optical waveguide in accordance with claim 36, wherein said non-monocrystalline intervening layer is made of metallic oxide.

40. An optical waveguide in accordance with claim 36, wherein said non-monocrystalline intervening layer includes silicon.

41. An optical waveguide in accordance with claim 36, wherein said non-monocrystalline intervening layer is made of silicon dioxide or silicon nitride.

42. An optical waveguide in accordance with claim 36, wherein said non-monocrystalline intervening layer is made of glass.

43. An optical waveguide in accordance with claim 36, further comprising:
a thicker portion provided in either substrate having a larger index of refraction of said first and second transparent monocrystalline dielectric substrates, wherein light is three-dimensionally confined.

44. An optical waveguide in accordance with claim 36, wherein said non-monocrystalline intervening layer has a thickness more than one wavelength of light to be confined.

* * * * *